(12) United States Patent
Hobby et al.

(10) Patent No.: US 10,976,290 B2
(45) Date of Patent: Apr. 13, 2021

(54) DATA PROCESSING METHOD FOR CHROMATOGRAPH MASS SPECTROMETRY, CHROMATOGRAPH MASS SPECTROMETER, AND NON-TRANSITORY STORAGE MEDIUM STORING PROGRAM FOR PROCESSING CHROMATOGRAPH MASS SPECTROMETRY DATA

(71) Applicant: SHIMADZU CORPORATION, Kyoto (JP)

(72) Inventors: Kirsten Hobby, Milton Keynes (GB); Kiriko Matsuo, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 0 days.

(21) Appl. No.: 16/731,163

(22) Filed: Dec. 31, 2019

(65) Prior Publication Data

US 2020/0355654 A1 Nov. 12, 2020

Related U.S. Application Data

(60) Provisional application No. 62/843,670, filed on May 6, 2019.

(51) Int. Cl.
*G01N 30/72* (2006.01)
*H01J 49/00* (2006.01)
(Continued)

(52) U.S. Cl.
CPC ......... *G01N 30/7233* (2013.01); *B01D 59/44* (2013.01); *G01N 30/72* (2013.01);
(Continued)

(58) Field of Classification Search
CPC .......... G01N 30/7233; G01N 30/8637; G01N 30/8679; G01N 30/8693; G01N 30/72;
(Continued)

(56) References Cited

U.S. PATENT DOCUMENTS

2007/0158542 A1* 7/2007 Bauer ................. H01J 49/0036
250/282
2016/0139140 A1 5/2016 Thompson et al.

FOREIGN PATENT DOCUMENTS

WO 2014/184320 A1 11/2014

OTHER PUBLICATIONS

"Data Processing Software for Profiling for LC/MS and GC/MS", Shimadzu Corp, 2019, 2 pages.
(Continued)

*Primary Examiner* — Kiet T Nguyen
(74) *Attorney, Agent, or Firm* — Sughrue Mion, PLLC

(57) ABSTRACT

Provided is a mass spectrometer including: a prediction equation storage section 34 configured to store a plurality of prediction equations which respectively correspond to different kinds of isotopic ions originating from a compound, each prediction equation expressing a relationship between m/z of a monoisotopic ion of the compound and a ratio between the signal intensity at the monoisotopic ion of the compound and the signal intensity of an isotopic ion in a mass spectrum; a measurement section 1 configured to perform chromatograph mass spectrometry on a sample to collect data; a predicted mass spectrum creation section 33 configured to calculate a predicted value of the signal intensity ratio related to each isotopic ion, by applying, in the prediction equations, m/z information corresponding to a peak observed on a measured mass spectrum and information of a given charge state of the ion, and to create a predicted mass spectrum based on the predicted values; and
(Continued)

a mass spectrum evaluation section 33 configured to evaluate the possibility that a plurality of peaks in the measured mass spectrum are peaks originating from one compound, by comparing the predicted mass spectrum and the measured mass spectrum.

9 Claims, 18 Drawing Sheets

(51) Int. Cl.
*H01J 49/04* (2006.01)
*G01N 30/86* (2006.01)
*B01D 59/44* (2006.01)
*G01N 30/02* (2006.01)

(52) U.S. Cl.
CPC ......... *G01N 30/86* (2013.01); *G01N 30/8631* (2013.01); *G01N 30/8637* (2013.01); *G01N 30/8651* (2013.01); *G01N 30/8679* (2013.01); *G01N 30/8693* (2013.01); *H01J 49/004* (2013.01); *H01J 49/0036* (2013.01); *H01J 49/0431* (2013.01); *G01N 2030/027* (2013.01); *G01N 2030/862* (2013.01)

(58) Field of Classification Search
CPC ............... G01N 30/86; G01N 30/8631; G01N 30/8651; G01N 2030/027; G01N 2030/862; H01J 49/0036; H01J 49/004; H01J 49/0431; B01D 59/44
USPC .................................................. 250/281, 282
See application file for complete search history.

(56) References Cited

OTHER PUBLICATIONS

Castillo et al., "Algorithms and tools for the preprocessing of LC-MS metabolomics data", Chemometrics and Intelligent Laboratory Systems, 2011, vol. 108, No. 1, pp. 23-32 (10 pages total).

Andreev et al., "A Universal Denoising and Peak Picking Algorithm for LC-MS Based on Matched Filtration in the Chromatographic Time Domain", Analytical Chemistry, 2003, vol. 75, No. 22, pp. 6314-6326 (13 pages total).

Valkenborg et al., "A Model-Based Method for the Prediction of the Isotopic Distribution of Peptides", Journal of the American Society for Mass Spectrometry, 2008, vol. 19, No. 5, pp. 703-712 (10 pages total).

Extended European Search Report dated Jun. 23, 2020 in European Application No. 19213260.3.

* cited by examiner

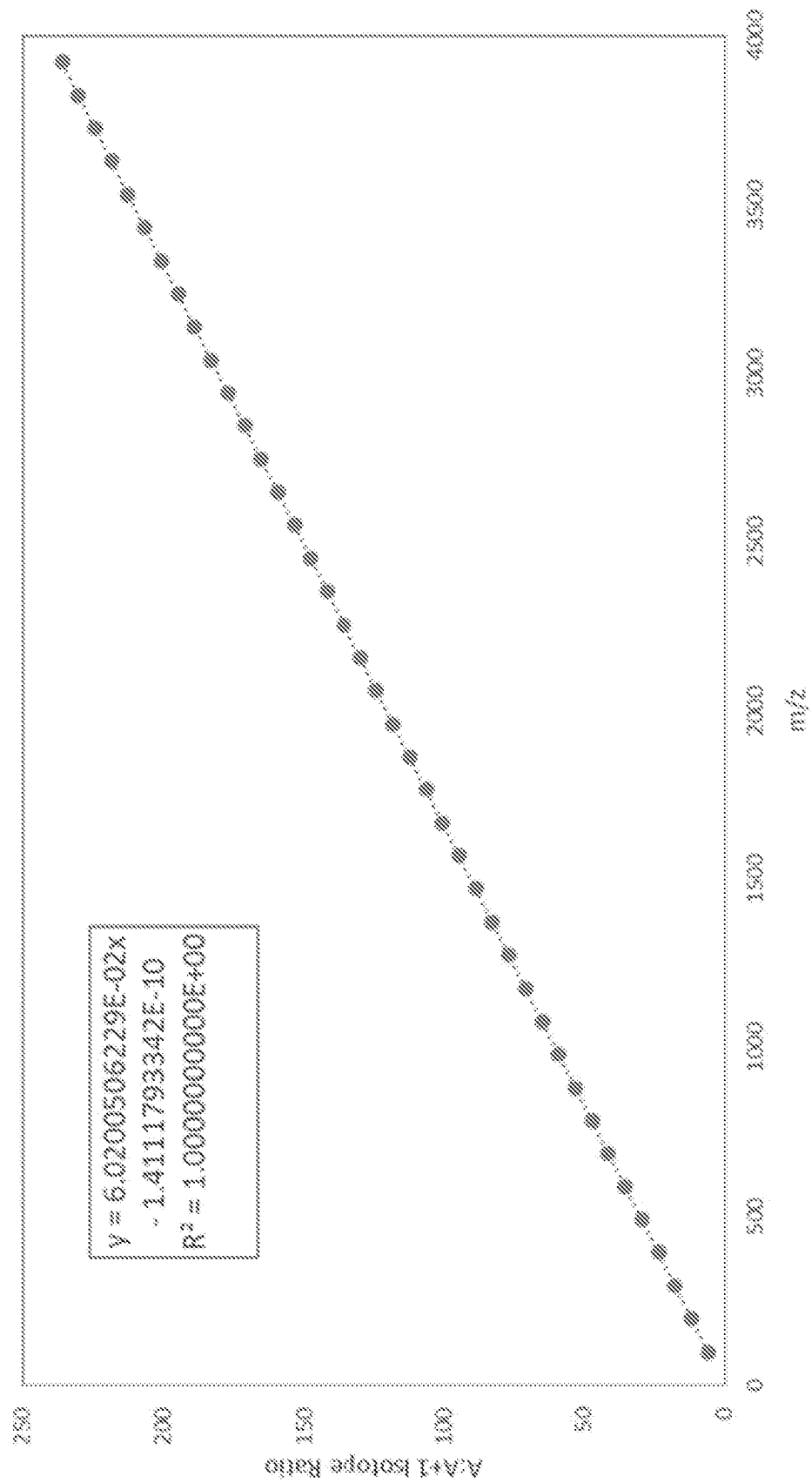

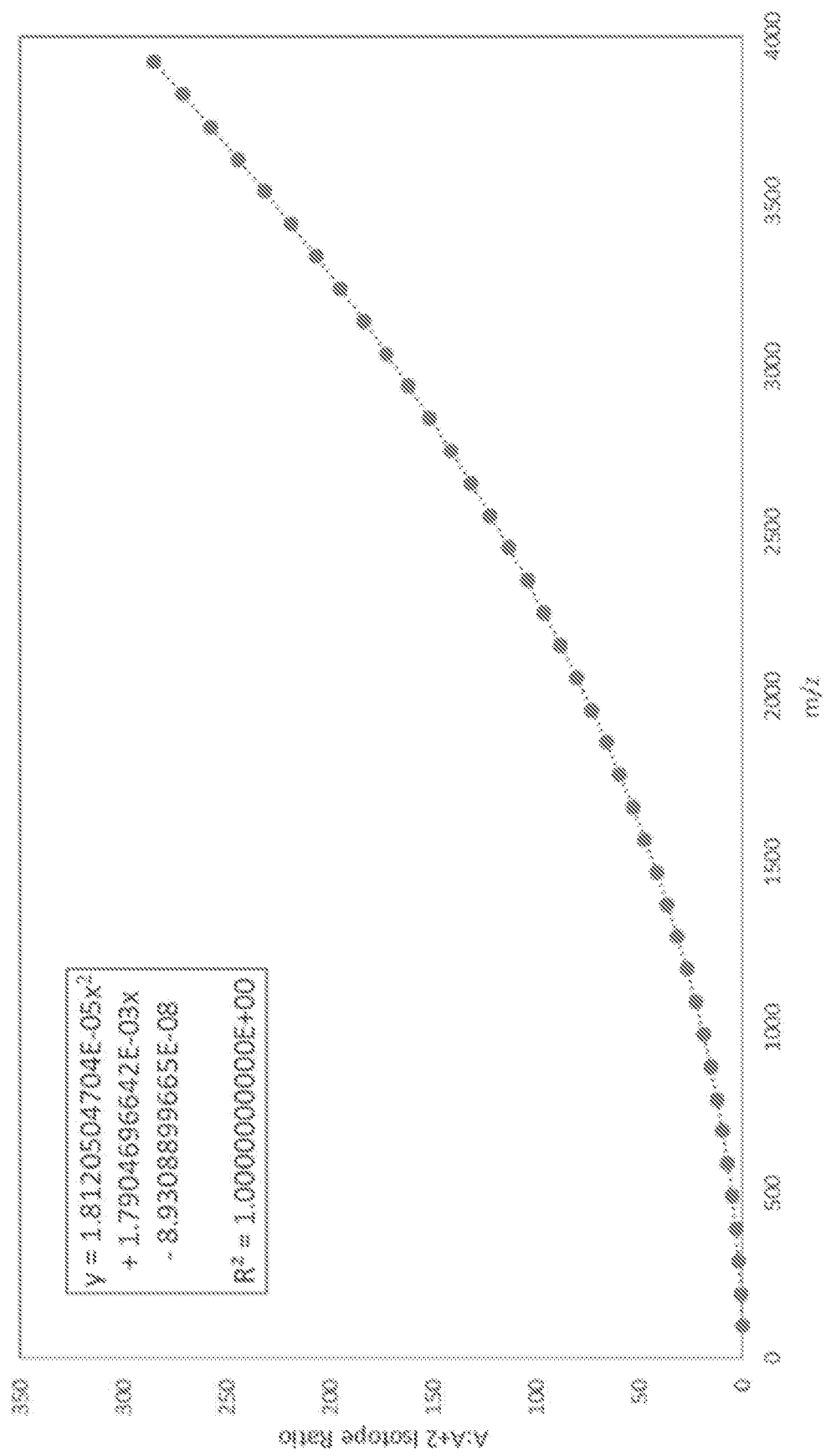

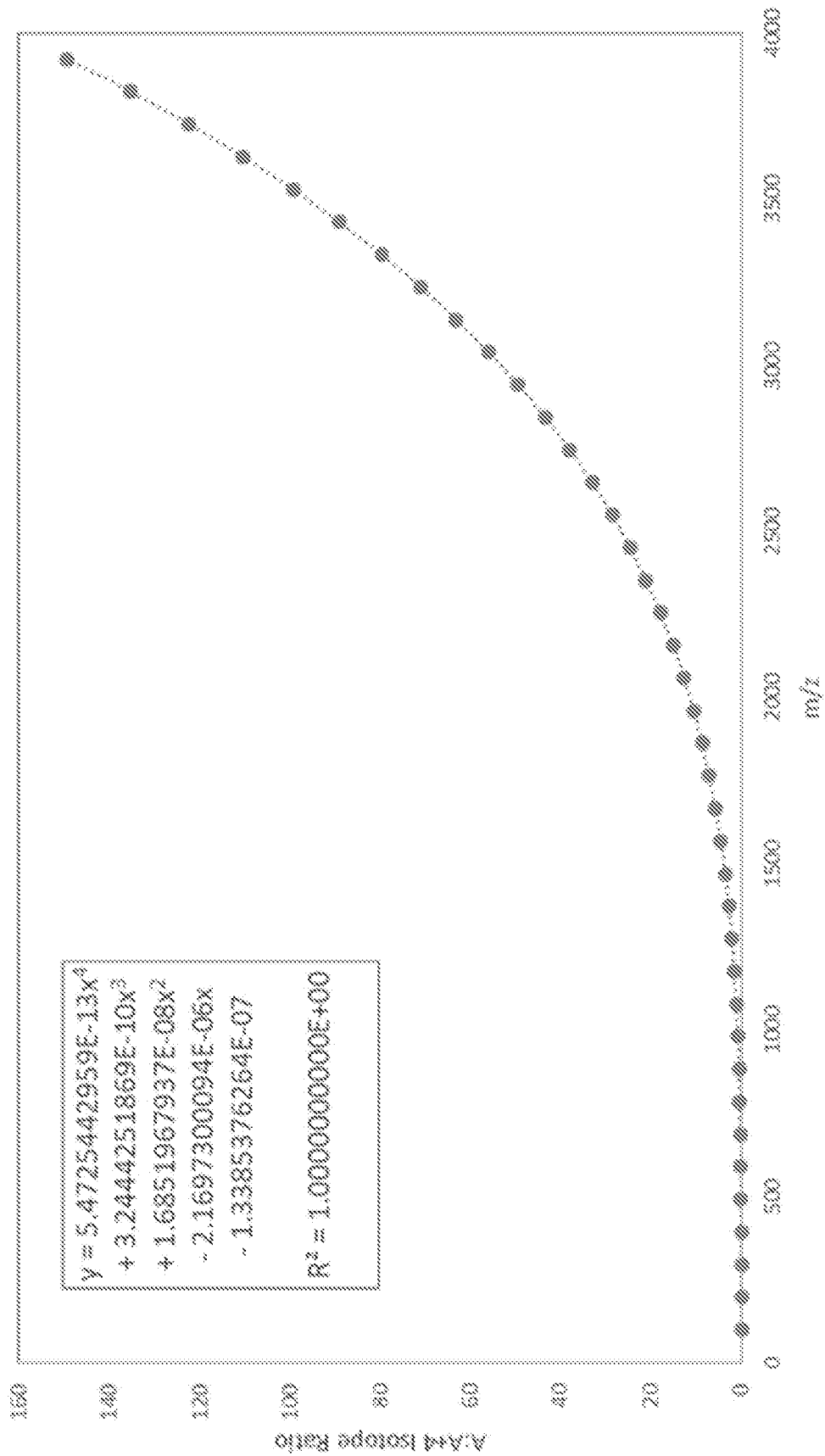

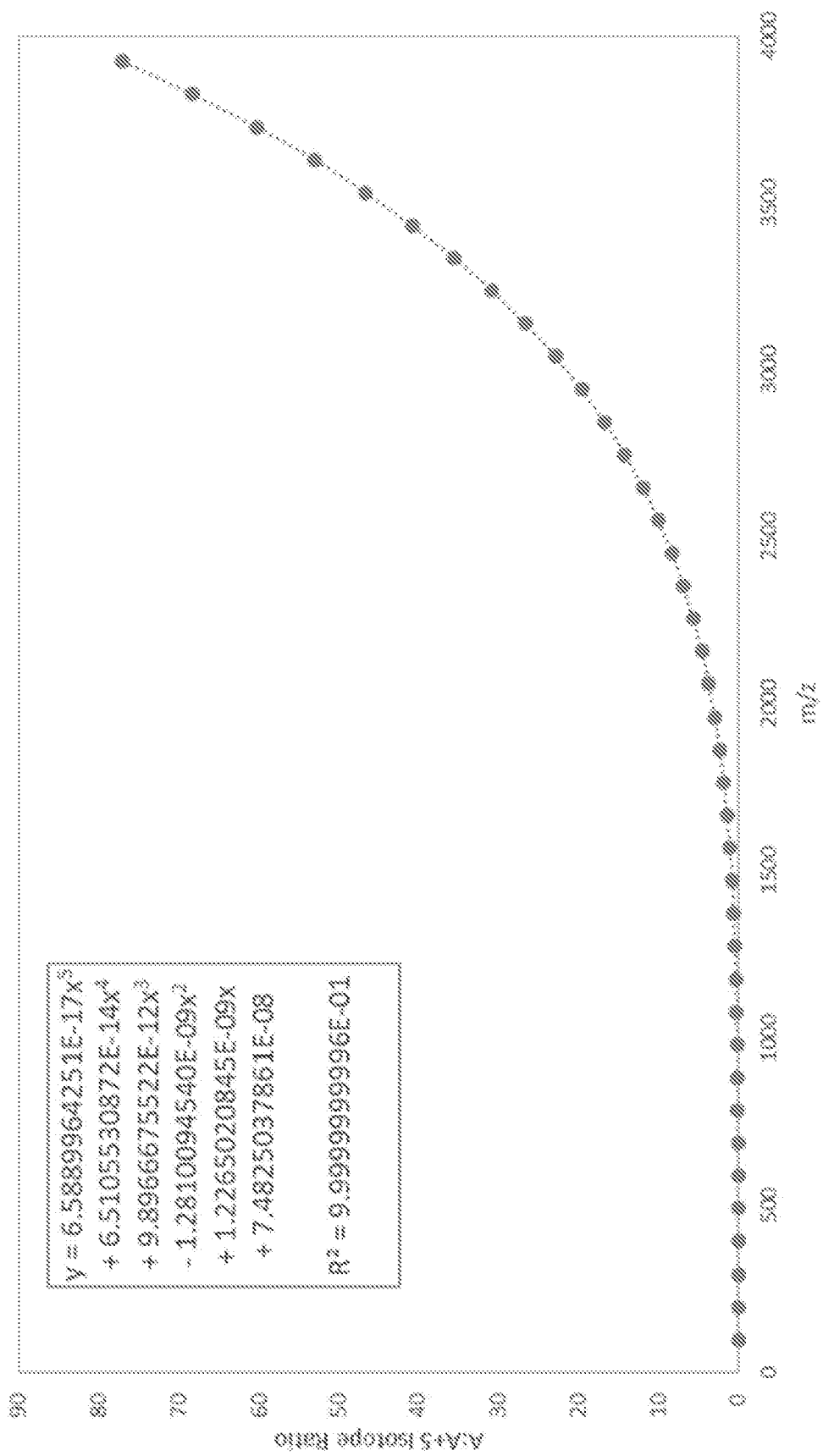

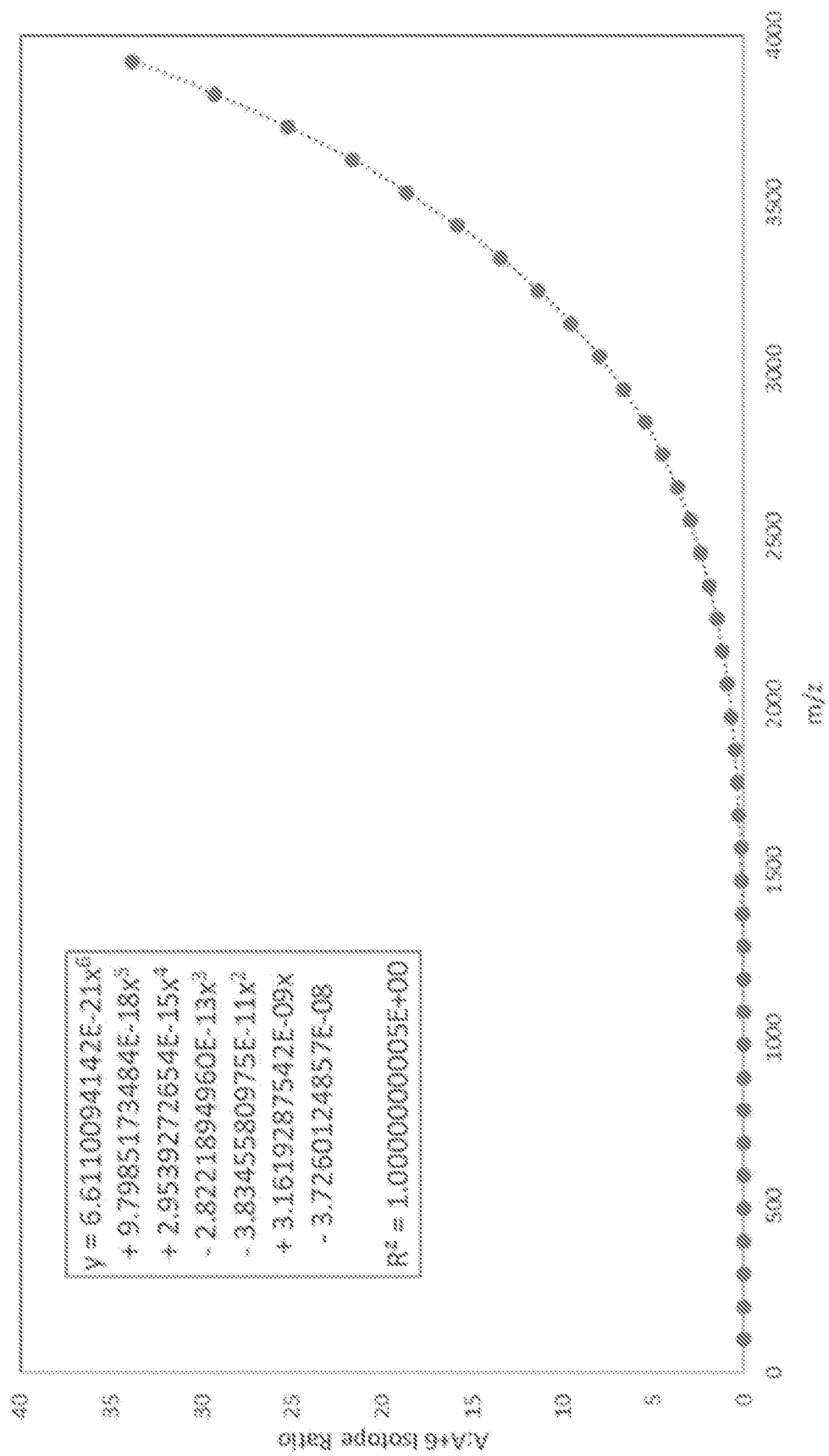

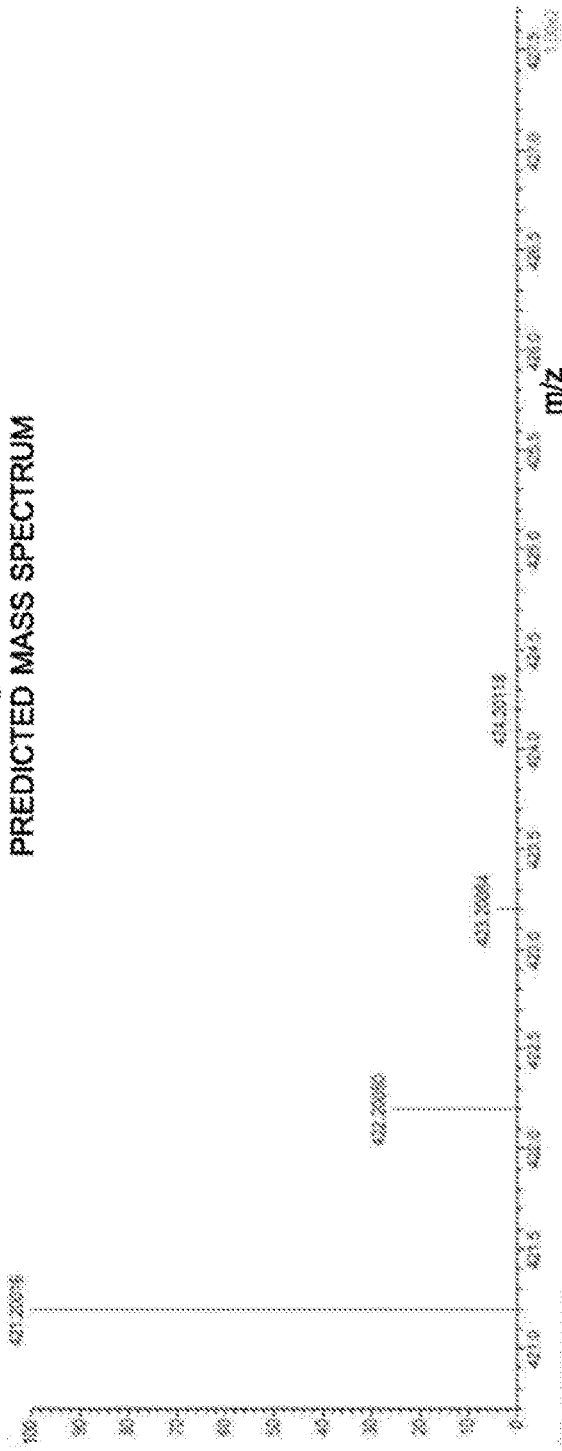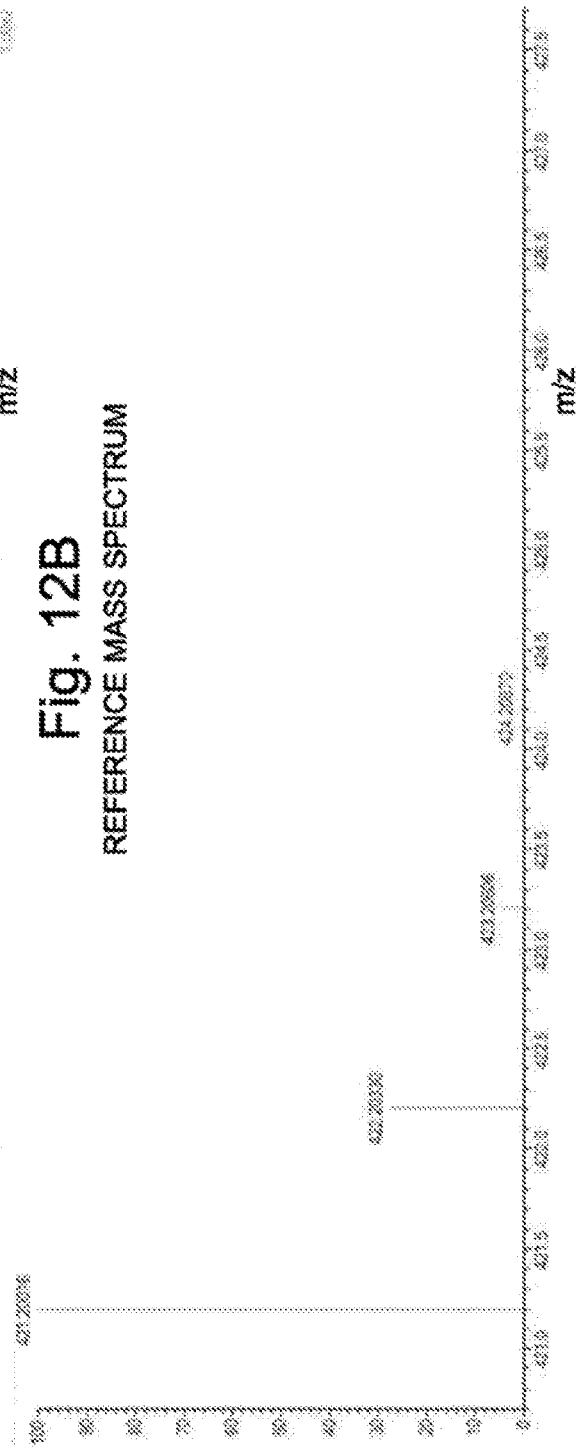

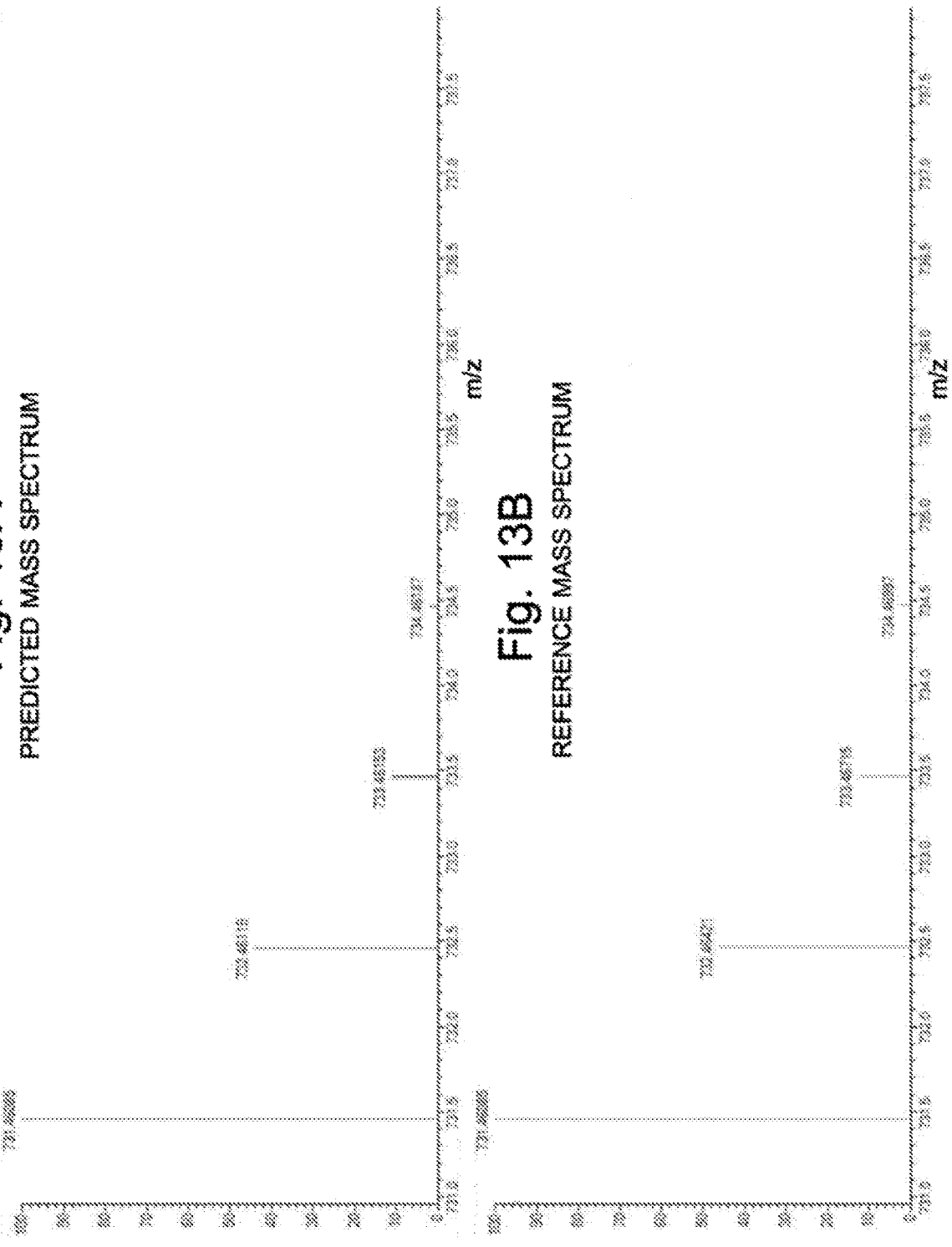

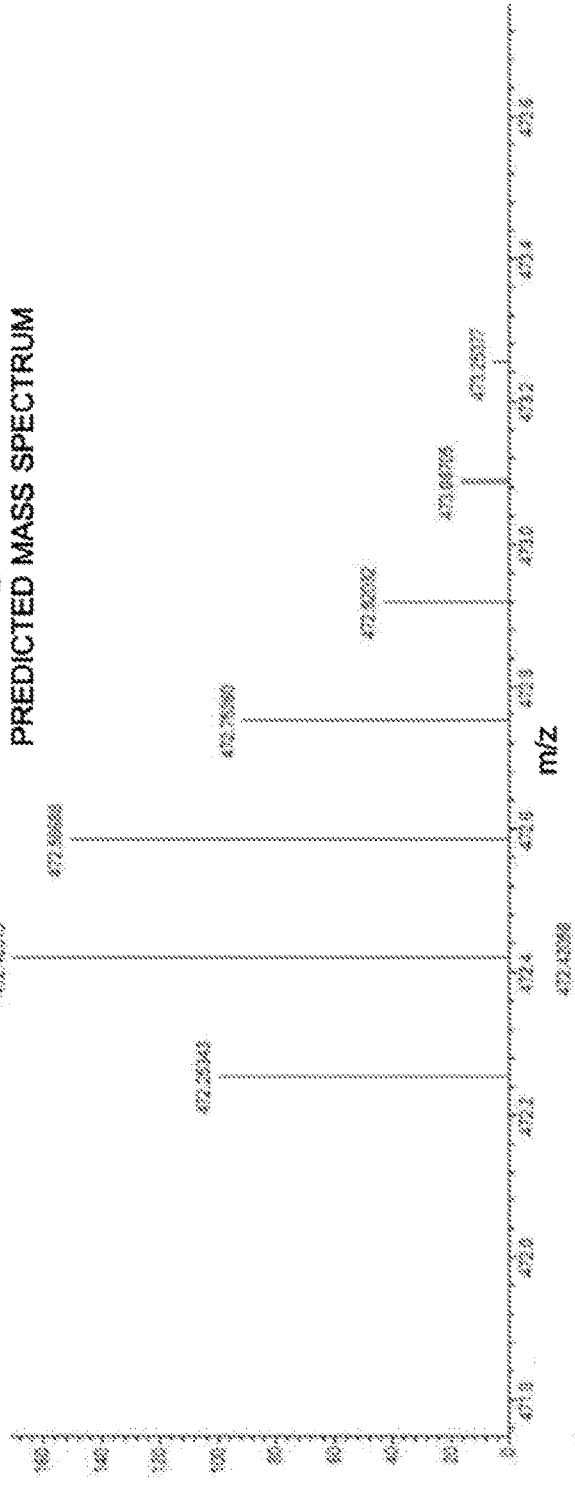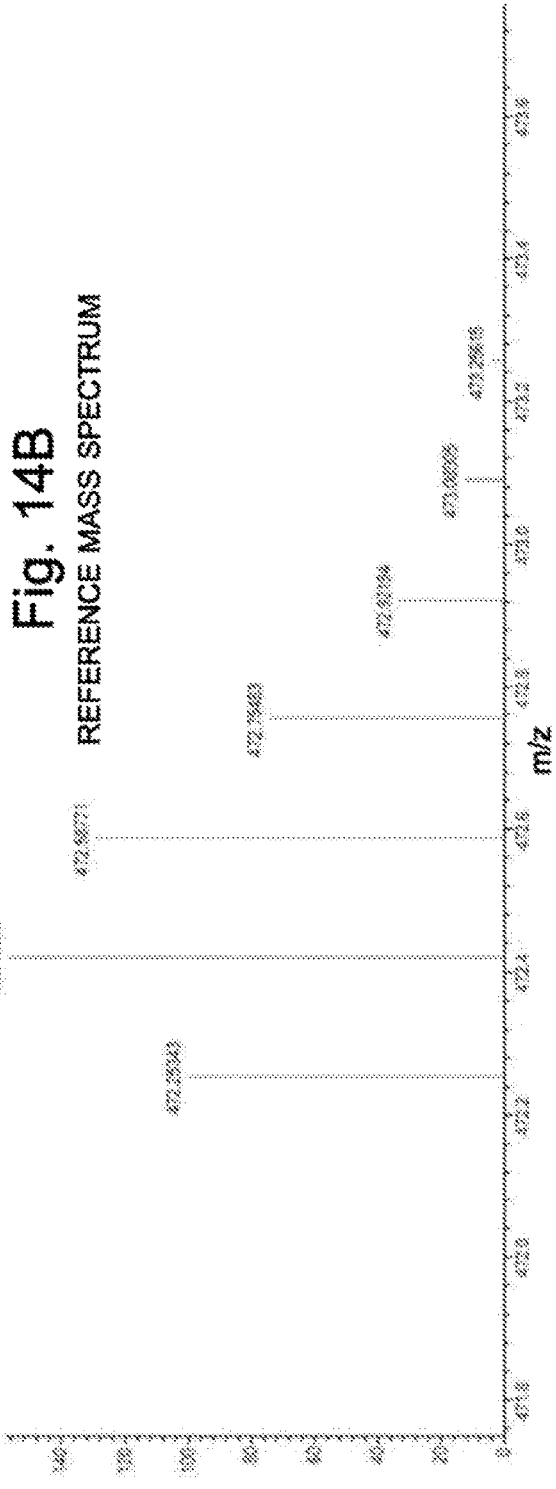

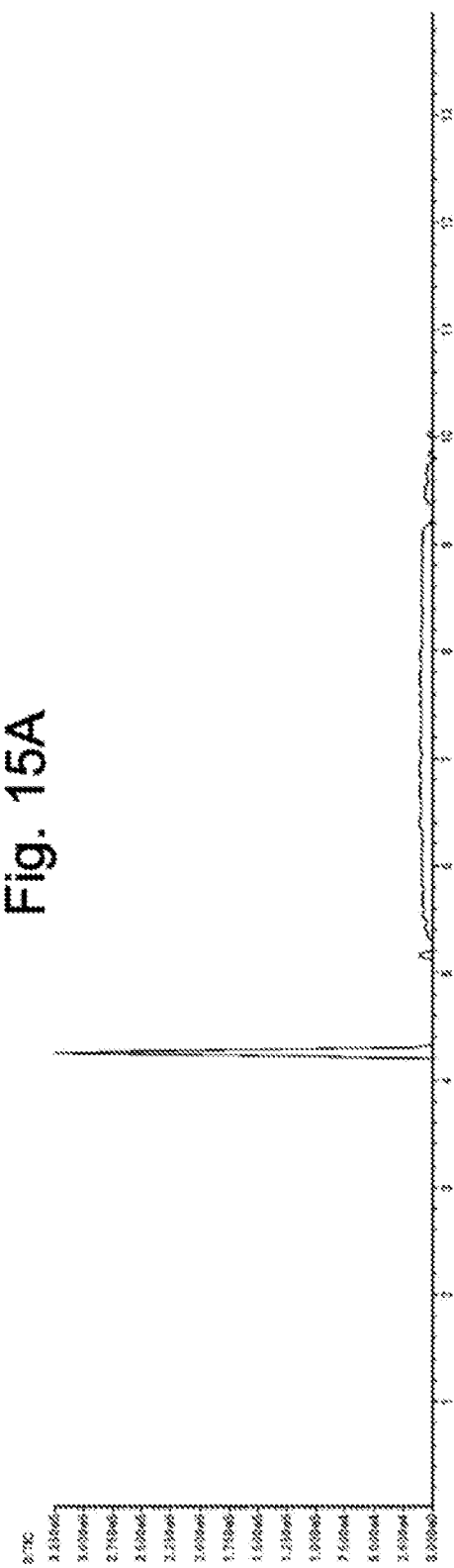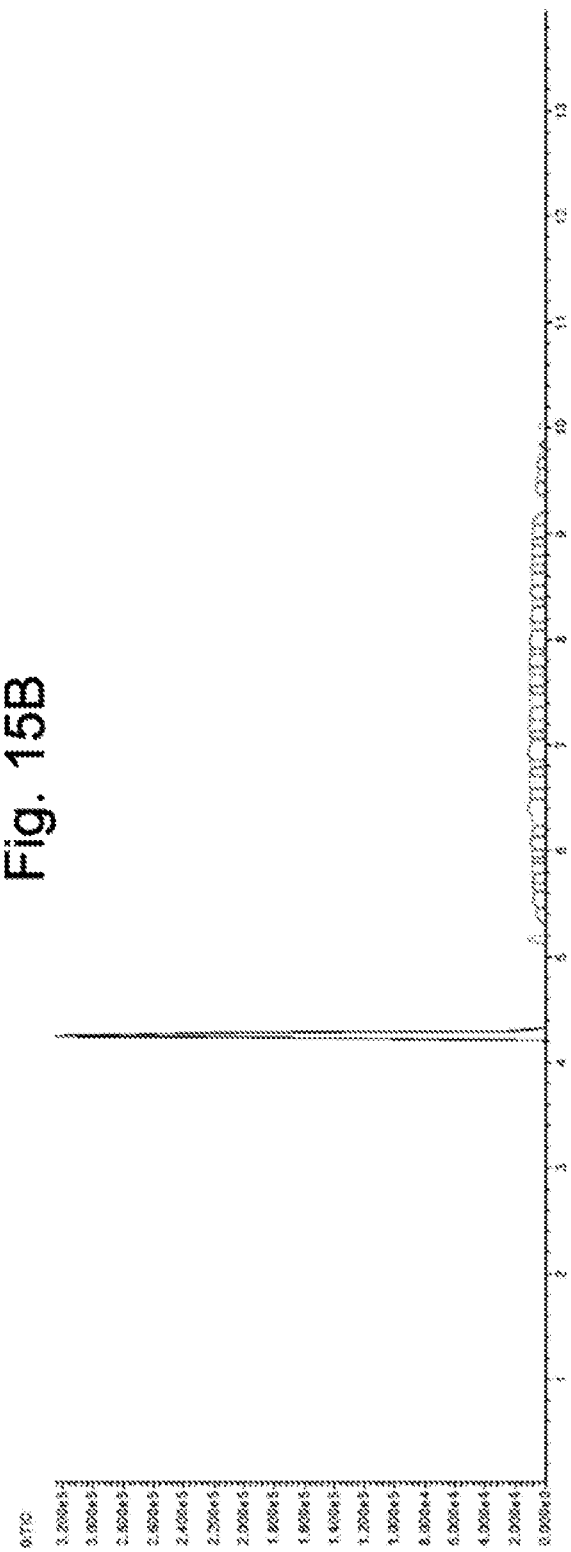

Fig. 16

| Component # | Time | m/z | Intensity | Peak Score |
|---|---|---|---|---|
| 1 | 4.25 | 165.09083 | 325527 | 100 |
| 2 | 5.16 | 165.09116 | 11381 | 0 |
| 3 | 5.39 | 165.09181 | 6139 | 0 |
| 4 | 5.53 | 165.09212 | 7861 | 0 |
| 5 | 5.64 | 165.09226 | 8174 | 0 |
| 6 | 5.73 | 165.09225 | 8362 | 0 |
| 7 | 5.83 | 165.09226 | 8824 | 0 |
| 8 | 5.91 | 165.09228 | 8782 | 0 |
| 9 | 5.97 | 165.09229 | 9115 | 0 |
| 10 | 6.07 | 165.09225 | 9777 | 0 |
| 11 | 6.18 | 165.09229 | 9086 | 0 |
| 12 | 6.36 | 165.09215 | 11612 | 0 |
| 13 | 6.53 | 165.09224 | 9862 | 0 |
| 14 | 6.64 | 165.09215 | 10604 | 0 |
| 15 | 6.74 | 165.09214 | 10335 | 0 |
| 16 | 6.82 | 165.09205 | 10414 | 0 |
| 17 | 6.95 | 165.09210 | 11589 | 0 |
| 18 | 7.09 | 165.09219 | 10091 | 0 |
| 19 | 7.18 | 165.09201 | 10925 | 0 |
| 20 | 7.29 | 165.09217 | 10232 | 0 |
| 21 | 7.42 | 165.09227 | 9985 | 0 |
| 22 | 7.52 | 165.09214 | 10355 | 0 |
| 23 | 7.61 | 165.09217 | 10142 | 0 |
| 24 | 7.69 | 165.09213 | 10441 | 0 |
| 25 | 7.79 | 165.09216 | 10526 | 0 |
| 26 | 7.88 | 165.09220 | 9902 | 0 |
| 27 | 7.99 | 165.09217 | 10426 | 0 |
| 28 | 8.12 | 165.09230 | 9480 | 0 |
| 29 | 8.23 | 165.09224 | 9683 | 0 |
| 30 | 8.34 | 165.09219 | 9128 | 0 |
| 31 | 8.44 | 165.09221 | 9655 | 0 |
| 32 | 8.57 | 165.09228 | 9041 | 0 |
| 33 | 8.67 | 165.09219 | 9228 | 0 |
| 34 | 8.74 | 165.09229 | 8993 | 0 |
| 35 | 8.83 | 165.09228 | 8701 | 0 |
| 36 | 8.92 | 165.09230 | 8851 | 0 |
| 37 | 9.02 | 165.09227 | 8580 | 0 |
| 38 | 9.13 | 165.09215 | 8351 | 0 |
| 39 | 9.43 | 165.09180 | 6267 | 0 |
| 40 | 9.54 | 165.09176 | 6058 | 0 |
| 41 | 9.66 | 165.09162 | 5252 | 0 |
| 42 | 9.74 | 165.09155 | 4412 | 0 |
| 43 | 9.84 | 165.09147 | 3584 | 0 |
| 44 | 10.02 | 165.09181 | 4330 | 0 |

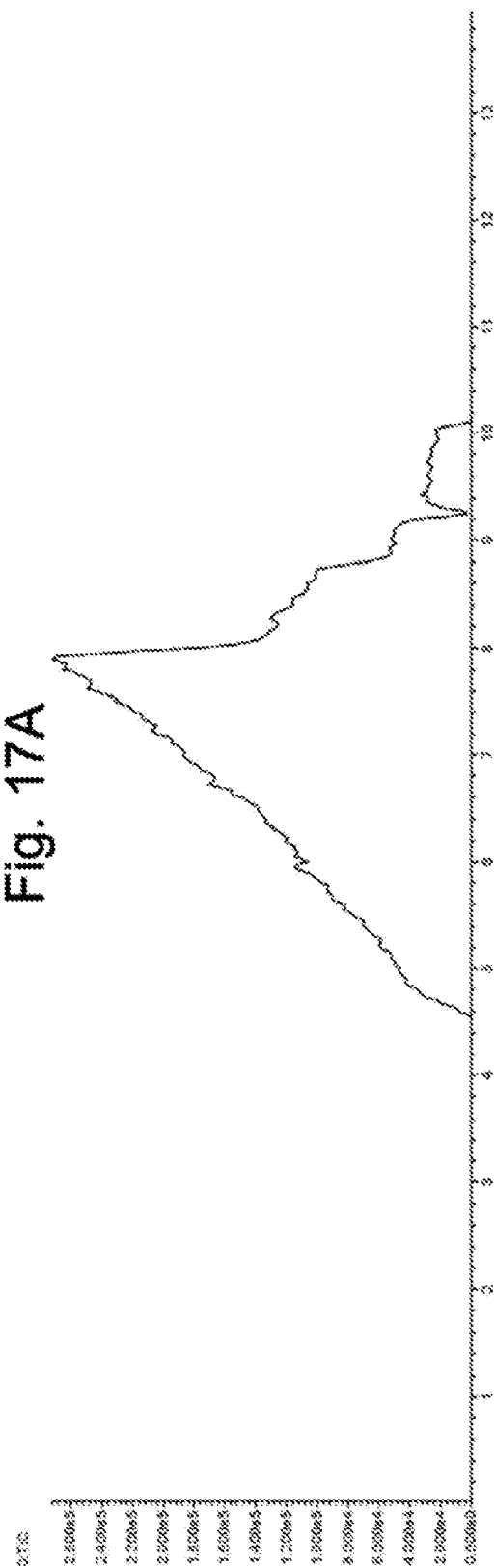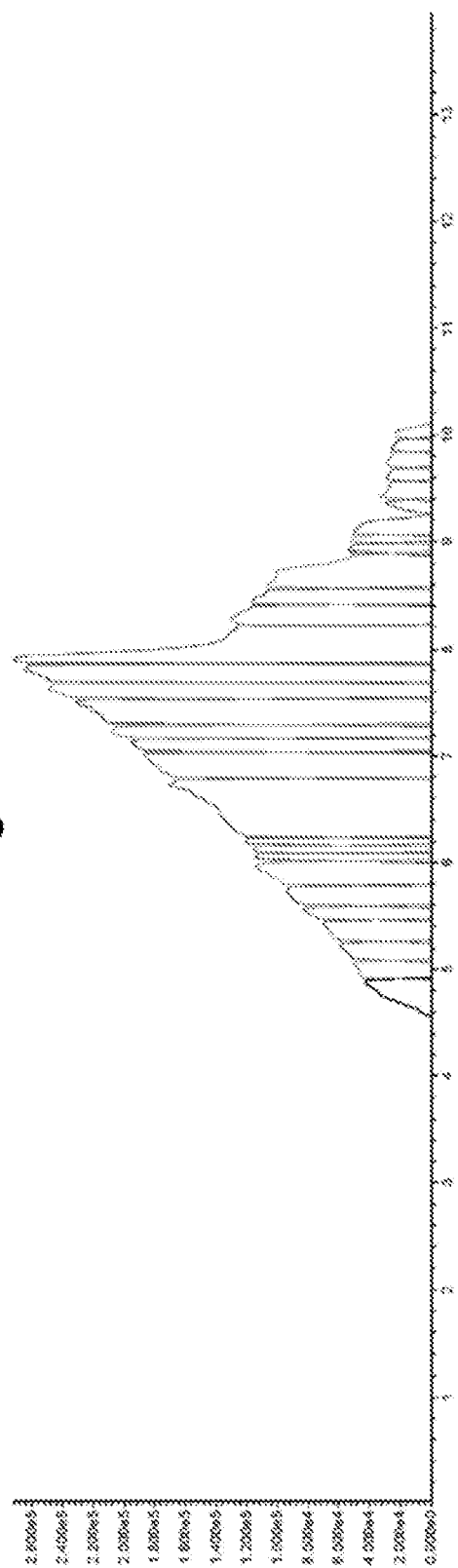

Fig. 18

| Component # | Time | Mass | Intensity | Peak Score | Pre-Ratio | Post-ratio |
|---|---|---|---|---|---|---|
| 1 | 4.79 | 618.22399 | 42734 | 0 | -- | 0.85 |
| 2 | 4.99 | 618.22403 | 50485 | 0 | 1.2 | 0.85 |
| 3 | 5.17 | 618.22408 | 59351 | 0 | 1.2 | 0.84 |
| 4 | 5.36 | 618.22424 | 70392 | 0 | 1.2 | 0.84 |
| 5 | 5.52 | 618.22415 | 83323 | 0 | 1.2 | 0.88 |
| 6 | 5.68 | 618.22425 | 94161 | 0 | 1.1 | 0.82 |
| 7 | 5.89 | 618.22400 | 114742 | 0 | 1.2 | 1.00 |
| 8 | 6.04 | 618.22409 | 114455 | 0 | 1.0 | 0.99 |
| 9 | 6.12 | 618.22407 | 115197 | 0 | 1.0 | 0.95 |
| 10 | 6.19 | 618.22417 | 120825 | 3.4 | 1.0 | 0.71 |
| 11 | 6.52 | 618.22428 | 170206 | 20.7 | 1.4 | 0.81 |
| 12 | 6.91 | 618.22452 | 187098 | 20.7 | 1.1 | 0.96 |
| 13 | 7.09 | 618.22445 | 194744 | 20.7 | 1.0 | 0.94 |
| 14 | 7.22 | 618.22439 | 207978 | 20.7 | 1.1 | 0.90 |
| 15 | 7.41 | 618.22452 | 231547 | 24.1 | 1.1 | 0.93 |
| 16 | 7.61 | 618.22451 | 248635 | 24.1 | 1.1 | 0.94 |
| 17 | 7.77 | 618.22452 | 264649 | 34.5 | 1.1 | 0.97 |
| 18 | 8.00 | 618.22433 | 272166 | 37.9 | 1.0 | 2.09 |
| 19 | 8.30 | 618.22387 | 130442 | 6.9 | 0.5 | 1.12 |
| 20 | 8.48 | 618.22378 | 116779 | 0 | 0.9 | 1.09 |
| 21 | 8.69 | 618.22356 | 107041 | 0 | 0.9 | 2.00 |
| 22 | 8.93 | 618.22287 | 53472 | 0 | 0.5 | 1.02 |
| 23 | 9.02 | 618.22284 | 52330 | 0 | 1.0 | 1.02 |
| 24 | 9.13 | 618.22279 | 51264 | 0 | 1.0 | 1.74 |
| 25 | 9.34 | 618.22249 | 29494 | 0 | 0.6 | 0.90 |
| 26 | 9.47 | 618.22124 | 32804 | 0 | 1.1 | 1.15 |
| 27 | 9.62 | 618.22109 | 28562 | 0 | 0.9 | 0.99 |
| 28 | 9.76 | 618.22103 | 28844 | 0 | 1.0 | 1.12 |
| 29 | 9.89 | 618.22110 | 25810 | 0 | 0.9 | 1.09 |
| 30 | 10.01 | 618.22048 | 23753 | 0 | 0.9 | -- |

DATA PROCESSING METHOD FOR CHROMATOGRAPH MASS SPECTROMETRY, CHROMATOGRAPH MASS SPECTROMETER, AND NON-TRANSITORY STORAGE MEDIUM STORING PROGRAM FOR PROCESSING CHROMATOGRAPH MASS SPECTROMETRY DATA

TECHNICAL FIELD

The present invention relates to a data processing method for chromatograph mass spectrometry, a chromatograph mass spectrometer using the same method, and a non-transitory storage medium storing a program for processing chromatograph mass spectrometry data to realize the same method using a computer. For example, the present invention is suitable for the detection of a considerable number of components in a sample to identify or check for a target component, or for the screening task for determining whether or not the target component is contained.

BACKGROUND ART

In a liquid chromatograph mass spectrometer (LC-MS) or gas chromatograph mass spectrometer (GC-MS), various components (compounds) contained in a sample are temporally separated from each other in the chromatograph unit, and the separated components are individually and sequentially detected in the mass spectrometer unit. In the present description, any type of device in which a chromatograph unit and a mass spectrometer unit are combined, such as the LC-MS or GC-MS, is generally called the chromatograph mass spectrometer.

In a chromatograph mass spectrometer, a set of data having the three dimensions of retention time, mass-to-charge ratio (m/z) and signal intensity value can be collected by repeating a scan measurement covering a predetermined mass-to-charge-ratio (m/z) range in the mass spectrometer unit. In order to identify an unknown component or determine the presence or content of a specific component based on the collected data using a computer, various data-processing software products have conventionally been used.

For example, Non Patent Literature 1 discloses a product named "Profiling Solution" as a piece of software for processing chromatograph mass spectrometry data. This software can process a set of unprocessed data acquired with a chromatograph mass spectrometer (such data may hereinafter be called the "raw data" according to conventions) to detect peaks on mass spectra as well as peaks on chromatograms, and create a peak list for a multivariate analysis. Such a type of software is particularly useful for reducing the burden on the user, improving the efficiency of the analysis, or obtaining other favorable effects in the case where a huge amount of data is acquired by the measurement due to the presence of a considerable number of components in the sample or a considerable number of samples to be analyzed.

CITATION LIST

Non Patent Literature

Non Patent Literature 1: "Profiling Solution ver. 1.1—Data Processing Software for Profiling for LC/MS and GC/MS", [online], [accessed on Jun. 12, 2019], Shimadzu Corporation, the Internet

SUMMARY OF INVENTION

Technical Problem

In general, a false-positive result often occurs in the peak detection process using such an existing software product. That is to say, an insignificant peak may possibly be included in a peak detection result. One of the major reasons is as follows: In organic compounds, a plurality of isotopes having different masses are often present for one compound. If a plurality of isotopic peaks associated with one compound observed on a mass spectrum cannot be correctly identified, those peaks cannot be detected as a plurality of peaks having a mass-to-charge ratio of a single ion (i.e. monoisotopic ion) but will be detected as a plurality of peaks each of which has a different mass-to-charge ratio.

A peak on a chromatogram or a peak on a mass spectrum corresponding to a compound of interest may possibly have a noise peak or background signal superposed due to various factors. Depending on the state of the data, it may be impossible to correctly discriminate between such an unnecessary component and a peak originating from the compound of interest, which leads to a false-positive or false-negative result.

In order to eliminate such a false-positive or false-negative result, various attempts have conventionally been made to improve the algorithms for the peak detection or component identification. However, those improvements to the algorithms have not always produced satisfactory results, partly because samples to be analyzed with chromatograph mass spectrometers in recent years have become increasingly complex. Furthermore, an attempt to improve the accuracy of the peak detection or component identification tends to increase the number of kinds of parameters to be set by users, which produces unfavorable effects, such as a deterioration in operability or an increase in the amount of time for the data processing.

The present invention has been developed to solve the previously described problem. Its primary objective is to provide a data processing method for chromatograph mass spectrometry, a chromatograph mass spectrometer, and a program for processing chromatograph mass spectrometry data by which a peak corresponding to an ion originating from a compound of interest can be detected correctly, i.e. in such a manner that false-positive or false-negative results are less likely to occur.

An additional objective of the present invention is to provide a data processing method for chromatograph mass spectrometry, a chromatograph mass spectrometer, and a program for processing chromatograph mass spectrometry data by which the number of kinds of parameters to be set by a user for a correct peak detection or other purposes can be reduced so as to reduce the burden on the user as well as shorten the period of time for the data processing.

Solution to Problem

One mode of the data processing method for chromatograph mass spectrometry according to the present invention developed for solving the previously described problem is a data processing method for chromatograph mass spectrometry configured to process three-dimensional data having the three dimensions of time, mass-to-charge ratio and signal intensity collected by chromatograph mass spectrometry, the method including:

a prediction equation creation step configured to create and store a prediction equation for each of different kinds of isotopic ions originating from a compound, the prediction equation including the charge state of an ion as a parameter and expressing a relationship between the mass-to-charge ratio of the monoisotopic ion of the compound and an intensity ratio between the signal intensity at the monoisotopic ion of the compound and the signal intensity of an isotopic ion in a mass spectrum;

a predicted mass spectrum creation step configured to calculate a predicted value of the signal intensity ratio related to each isotopic ion, by applying information of the mass-to-charge ratio corresponding to a peak observed on a measured mass spectrum acquired based on the three-dimensional data for a target sample, and information of a given charge state of the ion, in the prediction equations respectively created for the different isotopic ions in the prediction equation step, and to create, based on the predicted values, a predicted mass spectrum for a situation in which a monoisotopic ion and one or more isotopic ions originating from one compound are present; and a mass spectrum evaluation step configured to evaluate the possibility that a plurality of peaks in the measured mass spectrum are peaks corresponding to a monoisotopic ion and one or more isotopic ions originating from one compound, by comparing the predicted mass spectrum and the measured mass spectrum.

One mode of the chromatograph mass spectrometer according to the present invention developed for solving the previously described problem includes:

a prediction equation storage section configured to store a plurality of prediction equations which respectively correspond to different kinds of isotopic ions originating from a compound, where each of the prediction equations includes the charge state of an ion as a parameter and expresses a relationship between the mass-to-charge ratio of a monoisotopic ion of the compound and an intensity ratio between the signal intensity at the monoisotopic ion of the compound and the signal intensity of an isotopic ion in a mass spectrum;

a measurement section configured to perform chromatograph mass spectrometry on a sample to collect three-dimensional data having the three dimensions of time, mass-to-charge ratio and signal intensity;

a predicted mass spectrum creation section configured to calculate a predicted value of the signal intensity ratio related to each isotopic ion, by applying information of the mass-to-charge ratio corresponding to a peak observed on a measured mass spectrum acquired based on the three-dimensional data, and information of a given charge state of the ion, in the plurality of prediction equations stored in the prediction equation storage section, and to create, based on the predicted values, a predicted mass spectrum for a situation in which a monoisotopic ion and one or more isotopic ions originating from one compound are present; and a mass spectrum evaluation section configured to evaluate the possibility that a plurality of peaks in the measured mass spectrum are peaks corresponding to a monoisotopic ion and one or more isotopic ions originating from one compound, by comparing the predicted mass spectrum and the measured mass spectrum.

One mode of a non-transitory storage medium storing a program for processing chromatograph mass spectrometry data according to the present invention developed for solving the previously described problem is a non-transitory storage medium storing a program for processing chromatograph mass spectrometry data configured to operate a computer in order to process three-dimensional data having the three dimensions of time, mass-to-charge ratio and signal intensity collected by chromatograph mass spectrometry, where the program makes the computer function as:

a prediction equation storage functional section configured to store a plurality of prediction equations which respectively correspond to different kinds of isotopic ions originating from a compound, where each of the prediction equations includes the charge state of an ion as a parameter and expresses a relationship between the mass-to-charge ratio of a monoisotopic ion of the compound and an intensity ratio between the signal intensity at the monoisotopic ion of the compound and the signal intensity of an isotopic ion in a mass spectrum;

a predicted mass spectrum creation functional section configured to calculate a predicted value of the signal intensity ratio related to each isotopic ion, by applying information of the mass-to-charge ratio of a peak observed on a measured mass spectrum acquired based on the three-dimensional data for a target sample, and information of a given charge state of the ion, in the plurality of prediction equations corresponding to the different isotopic ions stored in the prediction equation storage functional section, and to create, based on the predicted values, a predicted mass spectrum for a situation in which a monoisotopic ion and one or more isotopic ions originating from one compound are present; and a mass spectrum evaluation functional section configured to evaluate the possibility that a plurality of peaks in the measured mass spectrum are peaks corresponding to a monoisotopic ion and one or more isotopic ions originating from one compound, by comparing the predicted mass spectrum and the measured mass spectrum.

The chromatograph mass spectrometer in the present invention is a liquid chromatograph mass spectrometer or gas chromatograph mass spectrometer.

Advantageous Effects of Invention

In the previously described modes of the data processing method for chromatograph mass spectrometry, chromatograph mass spectrometer, and non-transitory storage medium storing a program for processing chromatograph mass spectrometry data according to the present invention, the component to be analyzed is an organic compound which contains carbon, hydrogen oxygen and nitrogen as its main constituent elements. According to a study by the present inventors, a theoretically computed prediction equation which expresses a relationship between the mass of the monoisotopic ion of such a compound and a signal intensity ratio between the monoisotopic ion and an isotopic ion (this ratio is hereinafter called the "isotope signal intensity ratio") considerably reflects the peak pattern of the monoisotopic ion and the isotopic ion which will be observed on a measured mass spectrum, except for the case where the compound contains a certain kind of element other than the aforementioned elements.

Based on this finding, in the previously described mode of the data processing method for chromatograph mass spectrometry according to the present invention, after a measured mass spectrum to be analyzed has been created based on data acquired by performing chromatograph mass spectrometry for a target sample, a predicted mass spectrum creation step is performed in which information of the mass-to-charge ratio of one peak observed on the measured mass spectrum and information of a given charge state of the ion are applied in the prediction equation to calculate the signal intensity ratio related to each isotopic ion. The "one peak observed on the measured mass spectrum" may be an unknown peak observed on a measured mass spectrum. Based on the information of the signal intensity ratio calculated from each of the prediction equations created for different isotopes, a predicted mass spectrum is created, i.e. an isotopic peak pattern which is expected to be observed if the one peak mentioned earlier is the monoisotopic ion of one compound.

This isotopic peak pattern is a theoretically calculated one. If the one peak mentioned earlier is actually a peak corresponding to the monoisotopic ion of one compound, the isotopic peak pattern including that peak on the measured mass spectrum should match with the theoretical isotopic peak pattern to a considerable degree. Accordingly, in the mass spectrum evaluation step, the theoretically predicted mass spectrum and the measured mass spectrum are compared with each other to calculate, for example, an index value showing the degree of matching between the two isotopic peak patterns. Based on this index value, it is determined whether or not the isotopic peak pattern (and the estimated peak sequence) on the measured mass spectrum is most likely to be truly the isotopic peak group originating from one compound. Among the considerable number of peaks observed on a measured mass spectrum, a peak which has been identified as an isotopic peak and not a monoisotopic ion peak of a compound does not need to be subjected to the component identification process. Accordingly, for example, a peak which has been identified as an isotopic peak can be considered as a kind of noise and deleted. By such a processing, a significant peak which truly corresponds to the component can be selected.

By the data processing method for chromatograph mass spectrometry, chromatograph mass spectrometer, and non-transitory storage medium storing a program for processing chromatograph mass spectrometry data according to the present invention, it is possible to correctly determine that a monoisotopic ion peak originating from one compound and one or more isotopic ion peaks observed on a mass spectrum have originated from the same compound. Therefore, the situation in which such isotopic ion peaks are detected as false-positive peaks can be avoided. As a result, the peaks corresponding to the ions originating from the compound of interest can be correctly identified. There is only a small number of kinds of parameters to be set by a user for such a correct peak detection or other related tasks. This reduces the burden on the user as well as shortens the period of time required for the data-processing task.

BRIEF DESCRIPTION OF DRAWINGS

FIG. 6 is a diagram showing the relationship between the m/z value of a monoisotopic ion [A] and the ratio between the signal intensity of the monoisotopic ion [A] and that of the first isotopic ion [A+1].

FIG. 7 is a diagram showing the relationship between the m/z value of a monoisotopic ion [A] and the ratio between the signal intensity of the monoisotopic ion [A] and that of the second isotopic ion [A+2].

FIG. 9 is a diagram showing the relationship between the m/z value of a monoisotopic ion [A] and the ratio between the signal intensity of the monoisotopic ion [A] and that of the fourth isotopic ion [A+4].

FIG. 10 is a diagram showing the relationship between the m/z value of a monoisotopic ion [A] and the ratio between the signal intensity of the monoisotopic ion [A] and that of the fifth isotopic ion [A+5].

FIG. 11 is a diagram showing the relationship between the m/z value of a monoisotopic ion [A] and the ratio between the signal intensity of the monoisotopic ion [A] and that of the sixth isotopic ion [A+6].

FIGS. 12A and 12B are a reference mass spectrum and a predicted mass spectrum for chemical formula $C_{24}H_{27}N_3O_4$, respectively.

FIGS. 13A and 13B are a reference mass spectrum and a predicted mass spectrum for chemical formula $C_{41}H_{65}NO_{10}$, respectively.

FIGS. 14A and 14B are a reference mass spectrum and a predicted mass spectrum for chemical formula $C_{129}H_{193}N_{36}O_{36}$, respectively.

FIGS. 15A and 15B show examples of extracted ion chromatograms, where FIG. 15A is an extracted ion chromatogram based on bin-A data groups, while FIG. 15B is an extracted ion chromatogram based on bin-C data groups and bin-E data groups.

FIG. 16 is a table showing peak scores calculated based on the data shown in FIG. 15B.

FIGS. 17A and 17B show other examples of extracted ion chromatograms, where FIG. 17A is an extracted ion chromatogram based on bin-A data groups, while FIG. 17B is an extracted ion chromatogram based on bin-C data groups and bin-F data groups.

FIG. 18 is a table showing peak scores calculated based on the data shown in FIG. 17B.

DESCRIPTION OF EMBODIMENTS

A liquid chromatograph mass spectrometer (LC-MS) as one embodiment of the present invention is hereinafter described with reference to the attached drawings.

[1] Schematic Configuration of Device

Figure 1:
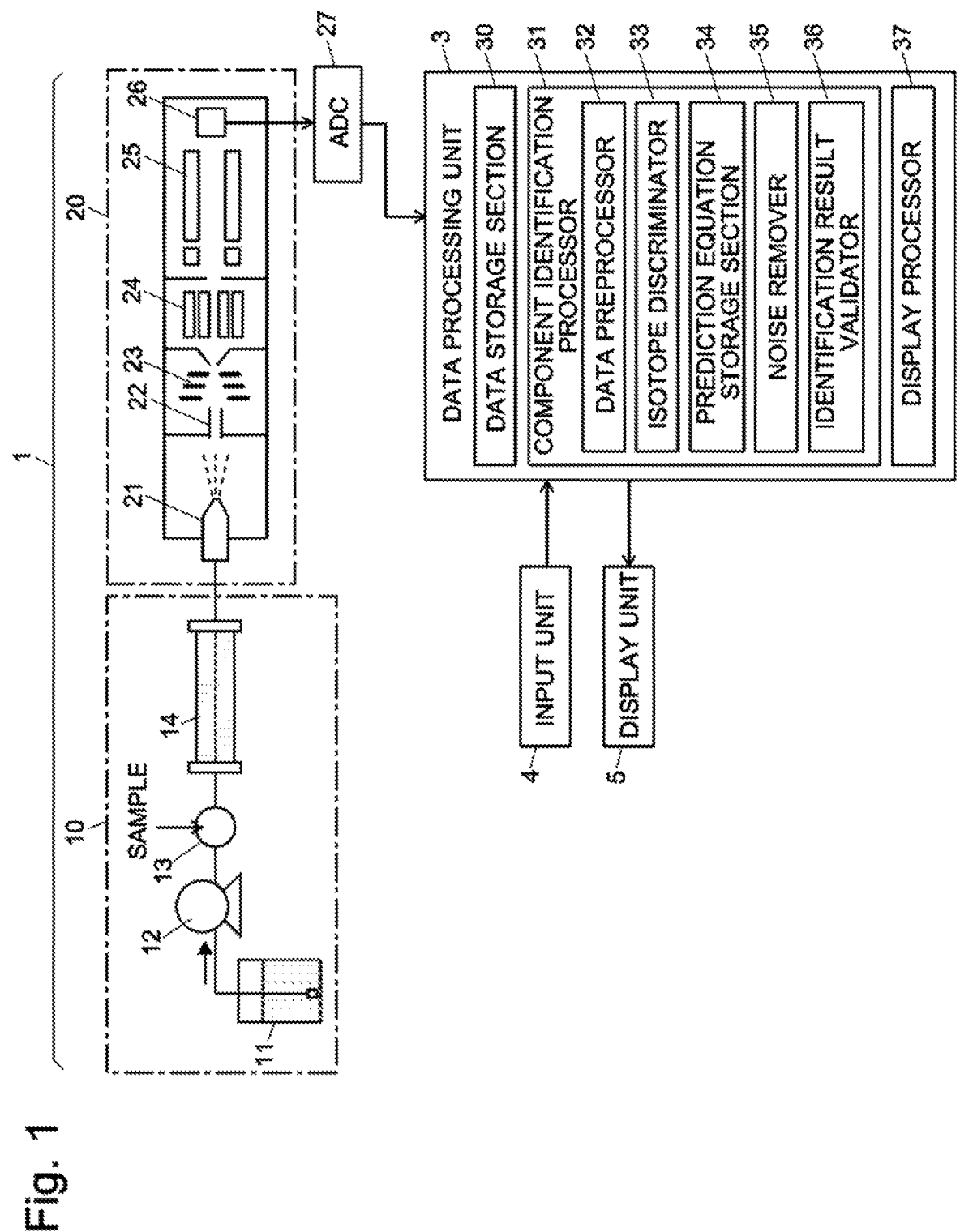
FIG. 1 is a schematic block diagram showing the configuration of an LC-MS as one embodiment of the present invention.

FIG. 1 is a block configuration diagram showing the main components of the LC-MS according to the present embodiment.

The present LC-MS includes a measurement unit 1, data processing unit 3, input unit 4 and display unit 5. The measurement unit 1 includes a liquid chromatograph section 10 and mass spectrometer section 20.

The liquid chromatograph section 10 includes a liquid-supply pump 12 configured to draw and supply a mobile phase from a mobile phase container 11, an injector 13 configured to inject a sample into the mobile phase, and a column 14 configured to separate the components in a sample in a temporal direction. The mass spectrometer section 20 includes an ionization probe 21 for ionization by electrospray ionization (ESI), a desolvation tube 22 configured to transport generated ions to the subsequent stage, two ion guides 23 and 24 each of which is configured to send ions to the subsequent stage while converging those ions, a quadrupole mass filter 25 configured to selectively allow an ion having a specific mass-to-charge ratio to pass through, and an ion detector 26 configured to detect ions.

The data processing unit 3 has the function of processing data acquired with the measurement unit 1, and includes a data storage section 30, component identification processor 31, display processor 37 and other functional blocks. The component identification processor 31 includes a data preprocessor 32, isotope discriminator 33, prediction equation storage section 34, noise remover 35, identification result validator 36 and other sub-functional blocks.

In normal cases, the data processing unit 3 is actually a personal computer, on which the aforementioned functional blocks are embodied by running, on the personal computer, a piece of data processing software (computer program) installed on the same computer.

This computer program for the data processing can be recorded in a non-transitory storage medium, such as a CD-ROM, DVD-ROM, memory card or USB memory (dongle) to be provided for users. Any of those storage media is an embodiment of the non-transitory storage medium storing a program for processing chromatograph mass spectrometry data according to the present invention. The program can also be provided for users in the form of data transferred through the Internet or similar communication lines. Needless to say, in the case of a system to be newly purchased by a user, the aforementioned computer program for the data processing may be previously installed on a computer included in the system.

[2] Schematic Measurement Operation

A measurement operation in the measurement unit 1 of the LC-MS according to the present embodiment is hereinafter briefly described. The liquid-supply pump 12 in the liquid chromatograph section 10 draws a mobile phase from the mobile phase container 11 and supplies it to the column 14 at a constant flow velocity. The injector 13 injects a predetermined amount of sample liquid into the mobile phase according to an instruction from the control unit (not shown). The injected sample liquid is carried by the mobile phase and enters the column 14. While the sample liquid is passing through the column 14, the various components (compounds) in the sample liquid are separated from each other in the temporal direction. An eluate which contains those separated components exits from the outlet end of the column 14 and is introduced into the ionization probe 21 in the mass spectrometer section 20.

The ionization probe 21 electrostatically sprays the introduced eluate into an ambience of substantially atmospheric pressure to ionize the components contained in the eluate. The generated ions are transported to the subsequent stages through the desolvation tube 22 as well as the ion guides 23 and 24, to be introduced into the quadrupole mass filter 25. A voltage corresponding to a target mass-to-charge ratio for the analysis is applied to the quadrupole mass filter 25, whereby only an ion having that target mass-to-charge ratio for the analysis is allowed to pass through the quadrupole mass filter 25 and reach the ion detector 26. During a scan measurement, the voltage applied to the quadrupole mass filter 25 is continuously and repeatedly changed so that the mass-to-charge ratio of the ion which is allowed to pass through the quadrupole mass filter 25 will change with the passage of time. The ion detector 26 produces an ion detection signal corresponding to the amount of ions which have reached the detector. The ion intensity signal is converted into digital data by an analogue-to-digital converter (ADC) 27 and sent to the data processing unit 3.

In normal cases, a scan measurement over a predetermined mass-to-charge-ratio range is repeatedly performed in the mass spectrometer section 20 during the measurement period from the point in time where the sample liquid is injected from the injector 13 into the mobile phase to the point in time where a predetermined measurement time elapses. By such an operation, three-dimensional data having the three dimensions of time, mass-to-charge ratio and signal intensity (ion intensity) is collected and saved in the data storage section 30.

The mass spectrometer section 20 in the LC-MS according to the present embodiment is a quadrupole mass spectrometer. The type of mass spectrometer section 20 is not limited to this one. For example, it may be a time-of-flight mass spectrometer, or it may also be a mass spectrometer capable of an MS/MS analysis (or MS$^n$ analysis, where n is an integer equal to or greater than two), such as a triple quadrupole mass spectrometer or quadrupole time-of-flight mass spectrometer. The ionization method in the mass spectrometer section 20 is not limited the ESI. Other ionization methods may also be used, such as an atmospheric pressure chemical ionization (APCI) or atmospheric pressure photoionization (APPI).

[3] Component Identification Process

By performing an LC/MS measurement on a sample in the previously described manner, three-dimensional data on the sample is stored in the data storage section 30. The component identification process which is performed in the data processing unit 3 based on such three-dimensional data is hereinafter described in detail.

As is commonly known, mass spectra and chromatograms (e.g. extracted ion chromatograms or total ion chromatogram) can be created from the three-dimensional data. A peak is observed on each mass spectrum as well as on each chromatogram. In the following description, the term "peak" is simply used if it is evident from the context whether the "peak" refers to a peak on a mass spectrum or one on a chromatogram. Otherwise a peak on a mass spectrum may be called a "mass peak", while a peak on a chromatogram may be called a "chromatogram peak".

Figure 2:
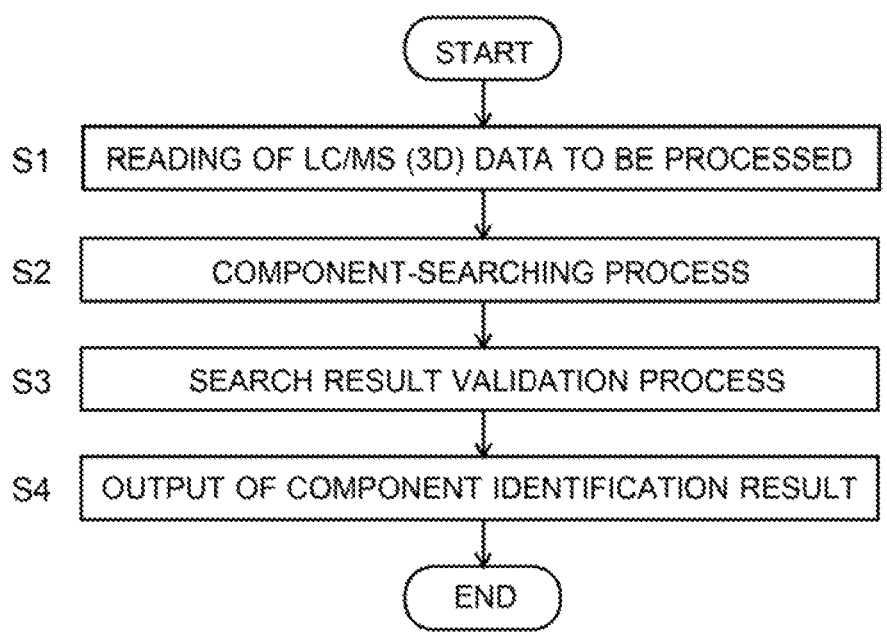
FIG. 2 is a schematic flowchart showing the data processing for component identification in the LC-MS according to the present embodiment.

FIG. 2 is an extremely schematic flowchart of the component identification process in the LC-MS according to the present embodiment.

When the component identification process is initiated in response to a predetermined operation from the input unit 4 by a user, the data preprocessor 32 in the component identification processor 31 reads three-dimensional data to be processed from the data storage section 30 (Step S1). The data preprocessor 32, isotope discriminator 33 and noise remover 35 search for a mass peak of a monoisotopic ion corresponding to the target component or significant component and determine its mass-to-charge ratio, as well as identify a chromatogram peak corresponding to the target component or significant component and determine its retention time. That is to say, they acquire the mass-to-charge ratio and retention time corresponding to the target component or significant component (Step S2). Subsequently, the identification result validator 36 validates the appropriateness of the result of the component search (Step S3). The display processor 37 outputs, on the display unit 5, the result of the identification of the components whose appropriateness has been confirmed by the validation process (Step S4).

Figure 3:
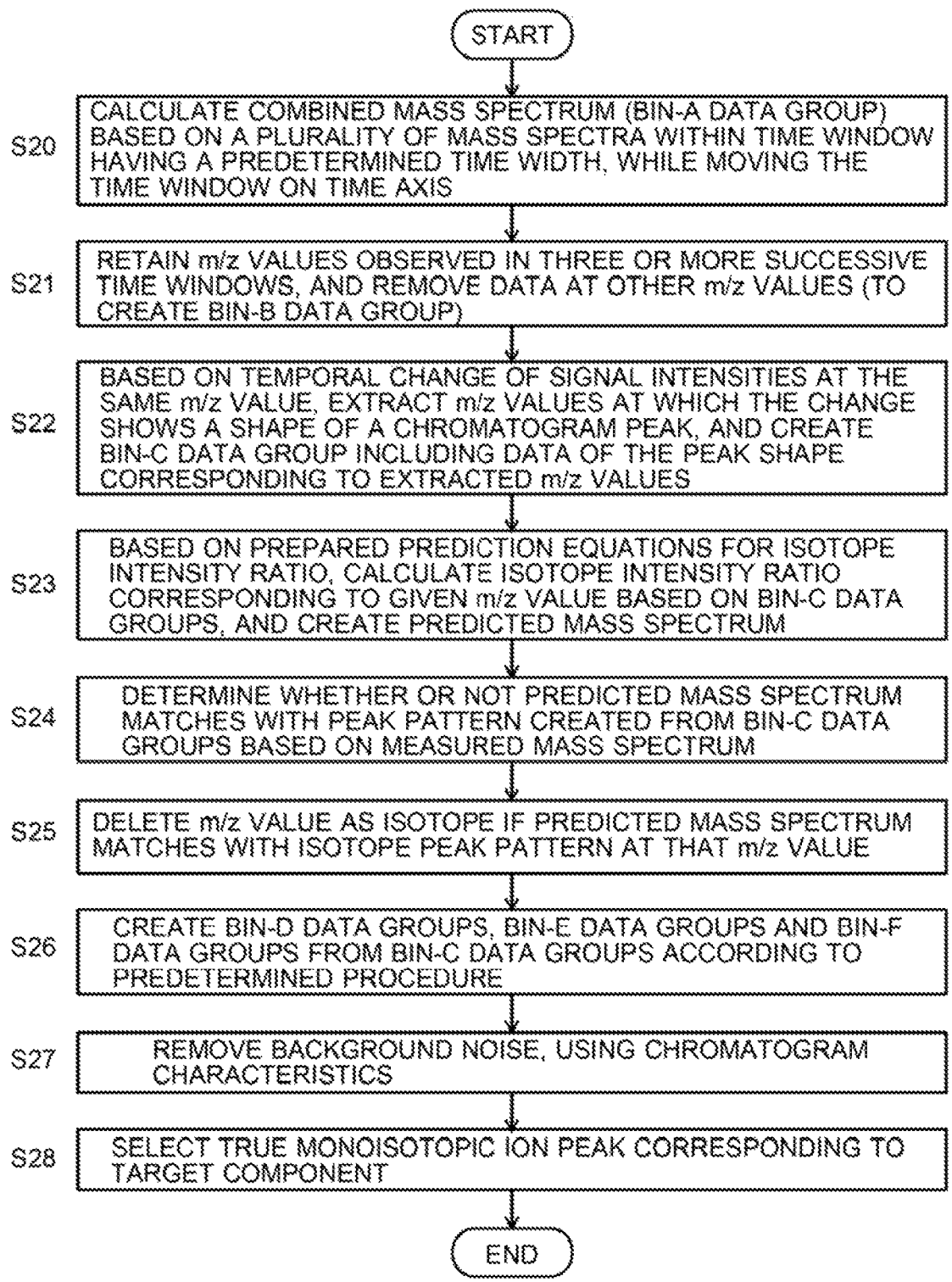
FIG. 3 is a flowchart of a component-searching process in the LC-MS according to the present embodiment.

FIG. 3 is a flowchart of the detailed processes in the component-searching process in Step S2.

[3-1] Data Preprocessing Before Peak Search

The raw data collected by a measurement include a considerable number of mass spectrum data covering a predetermined mass-to-charge-ratio range and arranged in the temporal direction at predetermined intervals of time. The amount of those data is extremely large. The data preprocessing is performed to aggregate such a huge amount of data to a certain extent so as to facilitate the data processing which will be described later.

Figure 5A:
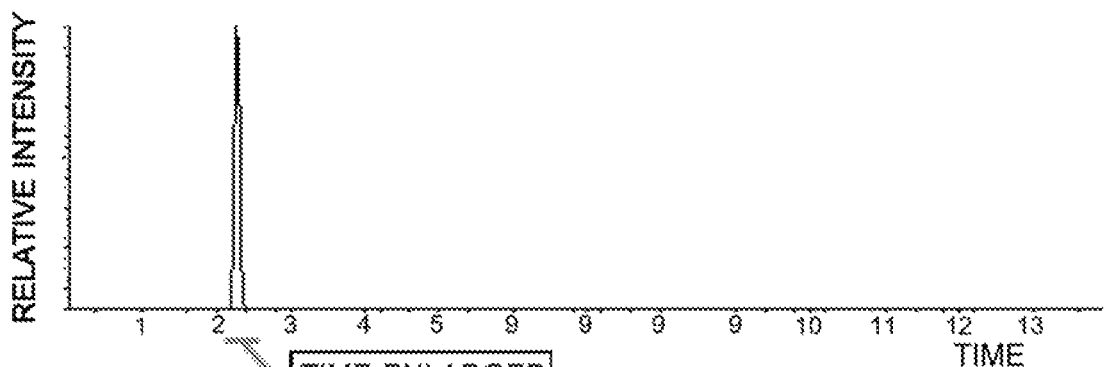
FIGS. 5A-5C are diagrams illustrating the data preprocessing in an isotope determination process performed in the component-searching process.
Figure 5B:
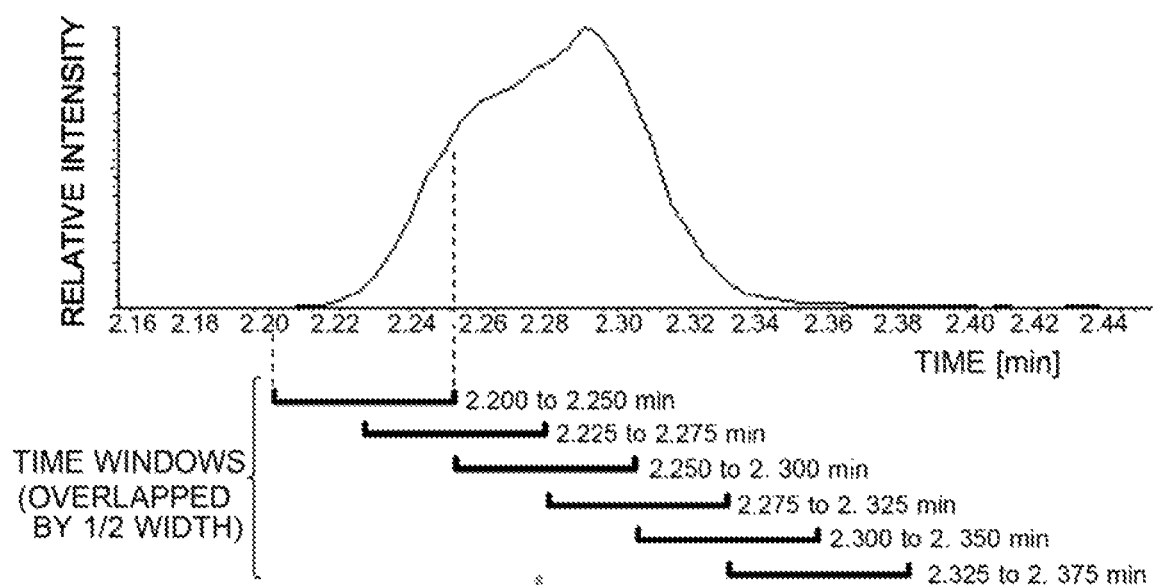
Figure 5C:
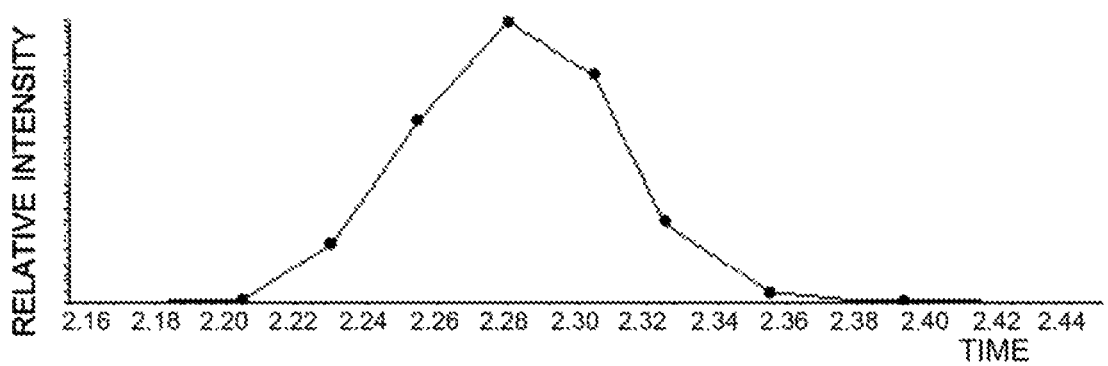
Figure 8:
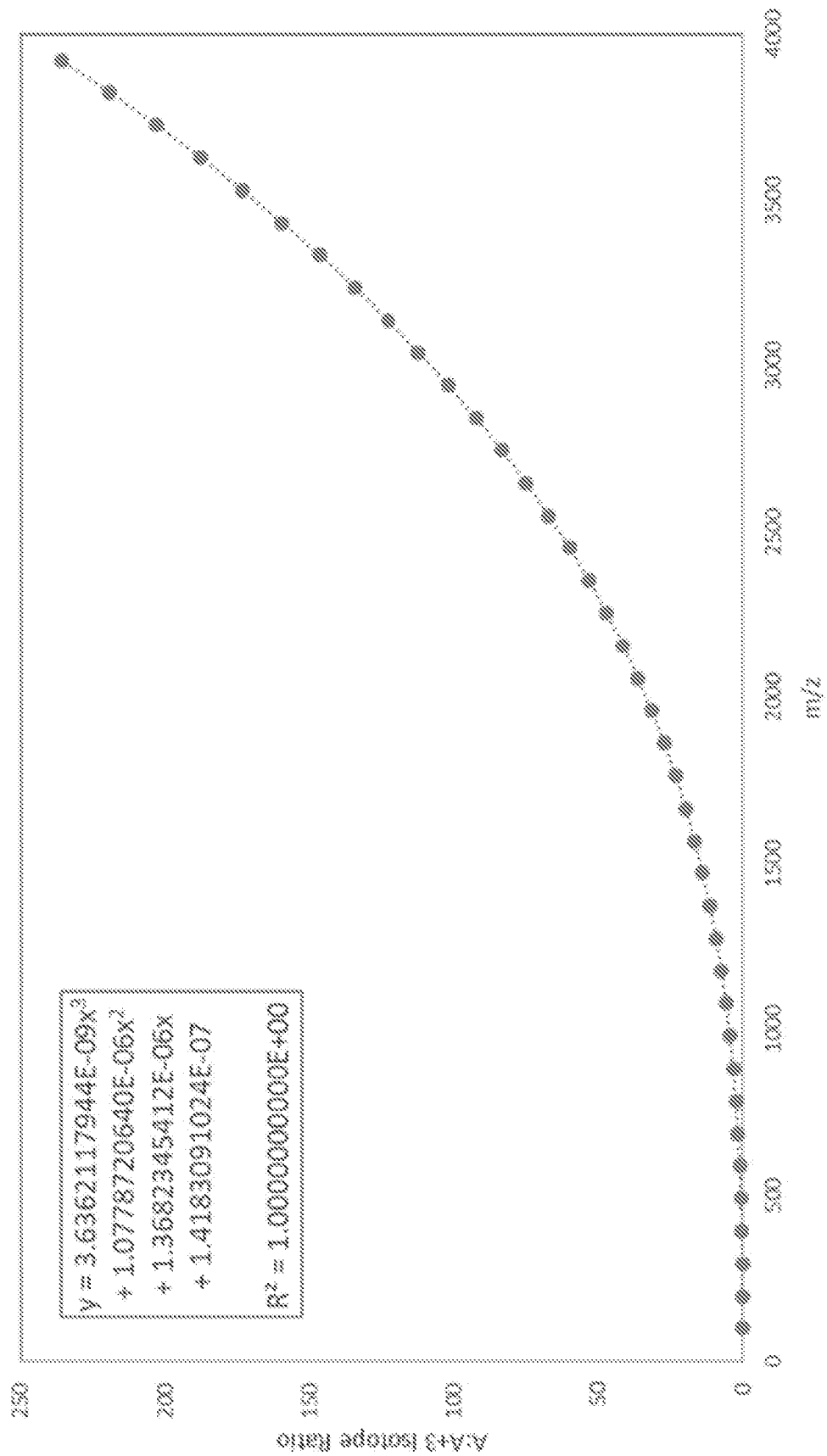
FIG. 8 is a diagram showing the relationship between the m/z value of a monoisotopic ion [A] and the ratio between the signal intensity of the monoisotopic ion [A] and that of the third isotopic ion [A+3].

FIGS. 5A-5C are diagrams illustrating the data preprocessing. FIG. 5A is an extracted ion chromatogram around one m/z value. FIG. 5B an enlarged view of a section near the peak in FIG. 5A.

In the data preprocessing, time windows having a predetermined time width are initially defined over the entire measurement time or a partially specified measurement-time range, and a plurality of mass spectrum data included in each time window are combined in the temporal direction to create one combined mass spectrum for one time window (Step S20). As shown in FIG. 5B, the time windows are successively set in the temporal direction in such a manner that the neighboring time windows overlap each other by approximately one half of their time width. Accordingly, two combined mass spectra corresponding to two neighboring time windows contain peak information of the same mass spectrum. The time width of the time windows may be appropriately set. As one preferable example, the time width may be set to be approximately equal to the full width at half maximum (FWHM) of a typical chromatogram peak.

The combined mass spectrum may be an average mass spectrum obtained by averaging, at each m/z value, the signal intensity values of all mass spectrum data included in the time window. Therefore, the group of data which form one combined mass spectrum corresponding to one time window includes signal intensity values respectively corresponding to a plurality of m/z values, and is related to one retention time. For example, this retention time may be the point in time at the center of the time window. For convenience of explanation, a group of data corresponding to one time window is hereinafter called the "bin-A data group". FIG. 5C is an extracted ion chromatogram obtained by redrawing the extracted ion chromatogram shown in FIG. 5B using the signal intensity value of each time window, i.e. each bin-A data group.

In the combined mass spectrum, various peaks observed in the plurality of mass spectra included in one time window appear. In normal situations, at least some of those peaks are noise peaks which are unrelated to the target component or significant component. In order to remove mass peaks at such insignificant m/z values, the bin-A data groups corresponding to the time windows located next to each other in the temporal direction (and partially overlapping each other) are sequentially compared to each other, and each m/z value which commonly appears in the bin-A data groups corresponding to three or more successive time windows (i.e. which has a significant signal intensity) are retained, while the other m/z values are removed from each bin-A data group (Step S21). That is to say, in the combined mass spectrum formed by the bin-A data groups, the signal intensity corresponding to an m/z value at which a common peak does not appear in three or more successive time windows has a value of zero.

When the bin-A data groups corresponding to the neighboring time windows are to be compared, the signal intensities at each m/z value are not simply compared with each other, but an allowable width of m/z is appropriately set. If there are m/z values which differ from each other yet fall within that allowable width, those m/z values are considered as the same m/z value, and the signal intensities at those m/z values are compared. More specifically, provided that a signal intensity corresponding to an m/z value of M1 is present in a bin-A data group in one time window, if a signal intensity corresponding to a different m/z value which is within the allowable width from M1 is present in an adjacent bin-A data group, the two m/z values are handled as an m/z value which commonly appears in both time windows. The allowable width of m/z can be appropriately set. For example, a 6-sigma method can be used, which is often used for determining such an allowable range. In that case, if the standard deviation of the mass error of the mass spectrometer section 20 is 1 mDa, the allowable m/z width is 6 mDa.

The group of data corresponding to one combined mass spectrum from which the data in the m/z-axis direction (signal intensity values at specific m/z values) have been deleted by the processing in Step S21 is hereinafter called a "bin-B data group". This means that one bin-B data group with the reduced amount of data is obtained from one bin-A data group.

In calculating the bin-B data group from the bin-A data group in the previously described manner, for example, information concerning a peak is deleted if this peak is observed only in a combined mass spectrum corresponding to one time window and is not observed in the combined mass spectrum corresponding to the neighboring time window. Therefore, for example, a noise peak having an extremely short duration due to a noise component of external origin is deleted. However, the influence of the background noise which is superposed on the entire measurement period or a comparatively long length of time within the measurement period cannot be deleted by the processing in Step S21, since the signal intensity due to such a type of noise is commonly present in three or more temporally consecutive bin-A data groups.

Accordingly, in the next step, the data preprocessor 32 performs a process in which significant m/z values are extracted from the bin-B data groups corresponding to a plurality of temporally consecutive time windows, using the state of change in the signal intensity value at the same m/z value. Specifically, the data preprocessor 32 sequentially examines the signal intensity values corresponding to the same m/z value (or the same allowable m/z range) in the bin-B data group in order of time and determines whether or not the signal intensity value increases to a local maximum and then decreases to a local minimum. In other words, the data preprocessor 32 determines whether or not the signal intensity value forms a typical (bell-like) shape as a chromatogram peak (Step S22). If an m/z value at which the chromatogram peak shows a shape having a maximum point between two minimum points has been detected, this m/z value as well as the plurality of signal intensity values within the period of time of the chromatogram-peak shape corresponding to the m/z value are stored as one "bin-C data group".

In the case where the signal intensity value decreasing from a maximum point once more begins to increase before reaching the level of zero and reaches another maximum point, the point of inflection from the decreasing phase to the increasing phase can be considered as a boundary which separates two chromatogram peaks located before and after that boundary, respectively, and one bin-C data group can be created and stored for each of those chromatogram peaks.

In the case where the target component has a plurality of isotopes, those isotopes have different masses. However, since they have the same retention time, their chromatogram peaks should be observed at different m/z values within the same time segment. By the previously described processing in Step S22, information concerning such different isotopic ions originating from the same component can be extracted.

Next, the isotope discriminator 33 performs the following process based on the bin-C data group to determine whether or not a plurality of m/z values extracted within the same time segment are the m/z values of isotopic ions originating from one component.

[3-2] Details of Isotope Discrimination Process

<Prediction Equations for Signal Intensity of Isotope>

A type of main analysis targets for LC-MS is the organic compound. Organic compounds are extremely diverse. Their most prevalent elements are carbon, hydrogen, oxygen and nitrogen. Organic compounds may additionally contain sulfur, phosphorus, chlorine or bromine, as well as various other kinds of metal. The abundance ratios of those elements are dramatically lower than those of the aforementioned main elements. Based on this fact, the present inventors have formed the hypothesis that a considerable portion of the contribution of the elements to the overall isotopic species present can be estimated by using a scalable model molecule to derive a relationship between an m/z value observed on a mass spectrum and the isotopic composition that can be estimated from the m/z value. Based on this hypothesis, the inventors have performed a curve fitting and experimental optimization process on mass spectrum data for a theoretical isotope model of a compound having a repetitive structure in which a partial structure expressed by chemical formula $C_5H_8NO$ is the basic unit. By such a process, mathematical equations to be used for predicting the signal intensities of a plurality of isotopic species which differ from each other in m/z value have been derived.

The chemical formula used as the basic unit is not limited to the one having the aforementioned elementary composition. Any chemical formula which has a predetermined composition ratio of carbon, hydrogen, oxygen and nitrogen can be used. It should be noted that the previously mentioned chemical formula $C_5H_8NO$ has been selected as the most preferable chemical formula according to a study by the present inventors based on the result of an empirical analysis on the diversity of the elemental composition of organic compound molecules.

The specific procedure for deriving the prediction equations in the LC-MS according to the present embodiment is as follows:

Initially, a theoretical isotopic model as a singly charged ion was created for each of the different kinds of isotopes for a model molecule within an m/z range up to m/z 4000. The signal intensity of each isotopic species in the theoretical isotopic models was normalized so that the signal intensity of the monoisotopic ion was 100%. Since the mass-resolving power was set to be 30000 FWHM in the process of modelling the isotopic species, the individual isotopic species are located at intervals of 1 Da.

Next, the signal intensities of the isotopic species in the theoretical isotopic model were individually examined. The ratio of the signal intensities at two isotopes among those isotopic species was plotted against the m/z value of the monoisotopic ion on a graph. Polynomial curve fitting was applied to each graph to derive a prediction equation that can be used to predict, from a given m/z value, the signal intensity ratio between the isotopes. The order of the polynomial equation for the curve fitting was incremented with an increase in the interval between the monoisotopic ion and the isotopic ion concerned.

FIGS. 6 to 11 are diagrams each of which shows a graph representing the relationship between the m/z value of the monoisotopic ion and the ratio between the signal intensity of the monoisotopic ion and that of the isotopic ion (i.e. the "isotope signal intensity ratio") as well as the result of the curve fitting. In those diagrams, "A" is the monoisotopic ion, while "A+1", "A+2", "A+3", "A+4", "A+5" and "A+6" are six kinds of isotopic ions (where the m/z value increases in order of the figure appended to the sign "+"). For example, FIG. 6 is a graph showing the relationship between the mass-to-charge-ratio value and the isotope signal intensity ratio between the monoisotopic ion [A] and the first isotopic ion [A+1].

From the curves shown in FIGS. 6 to 11, the prediction equation for the signal intensity of each isotope can be determined, as will be shown below. Those prediction equations are also shown in FIGS. 6 to 11. The value y calculated by each prediction equation shown in FIGS. 6 to 11, i.e. the isotope signal intensity ratio, is the magnitude of the signal intensity of each isotopic ion in the case where the signal intensity of the monoisotopic ion [A] is defined as 100.

Isotope signal intensity ratio between the monoisotopic ion [A] and the first isotopic ion [A+1]

$$y = 6.0200506229\text{E-}02x - 1.4111793342\text{E-}10 \quad (1)$$

Isotope signal intensity ratio between the monoisotopic ion [A] and the second isotopic ion [A+2]

$$y = 1.8120504704\text{E-}05x^2 + 1.7904696642\text{E-}03x - 8.9308899665\text{E-}08 \quad (2)$$

Isotope signal intensity ratio between the monoisotopic ion [A] and the third isotopic ion [A+3]

$$y = 3.6362117944\text{E-}09x^3 + 1.0778720640\text{E-}06x^2 + 1.3682345412\text{E-}06x + 1.4183091024\text{E-}07 \quad (3)$$

Isotope signal intensity ratio between the monoisotopic ion [A] and the fourth isotopic ion [A+4]

$$y = 5.4725442959\text{E-}13x^4 + 3.2444251869\text{E-}10x^3 + 1.6851967937\text{E-}08x^2 - 2.1697300094\text{E-}06x + 1.3385376264\text{E-}07$$

Isotope signal intensity ratio between the monoisotopic ion [A] and the fifth isotopic ion [A+5]

$$y = 6.5889964251\text{E-}17x^5 + 6.5105530872\text{E-}14x^4 + 9.8966675522\text{E-}12x^3 - 1.2810094540\text{E-}09x^2 + 1.2265020845\text{E-}09x + 7.4825037861\text{E-}08$$

Isotope signal intensity ratio between the monoisotopic ion [A] and the sixth isotopic ion [A+6]

$$y = 6.6110094142\text{E-}21x^6 + 9.7985173484\text{E-}18x^5 + 2.9539272654\text{E-}15x^4 - 2.8221894960\text{E-}13x^3 - 3.8345580975\text{E-}11x^2 + 3.1619287542\text{E-}09x - 3.7260124857\text{E-}08$$

In those equations, x is [m/z value] x [ion charge number], and y is a predicted value of the ratio of the signal intensity of the isotopic ion [one of A+1 to A+6] to that of the monoisotopic ion [A].

In the present embodiment, the prediction equations calculated beforehand in the previously described manner are stored in the prediction equation storage section 34. In practice, the prediction equations can be provided as a portion of the data processing software. The prediction equations may be stored in a tabular form in the prediction equation storage section 34 rather than the mathematical equations.

In order to determine an isotope signal intensity ratio for one compound using those prediction equations, two parameters should be set, i.e. the m/z value $mz_i$ of the monoisotopic ion of interest and the ion charge number $C_i$ for a model which should be created. After the two parameters have been determined, the predicted value of the signal intensity ratio of each isotopic species to the monoisotopic ion can be calculated based on the prediction equations. An estimated mass of the predicted isotope can be calculated by adding $(1.003354835/C_i) \times n$ to the mass of the monoisotopic ion, where n is the difference in integer mass unit between the isotope concerned and the monoisotopic ion. The used mass value is the mass of $C^{13}$ isotope. This mass is used because the majority of the contribution to the mass of an isotopic peak originates from this species ($C^{13}$) when the instrumental mass-resolving power is 30000 FWHM.

<Determination on Isotope Based on Mass Spectrum Using Prediction Equations>

In the present embodiment, the m/z value of the component to be identified based on the prediction equations is given by the bin-C data groups. The other parameter, i.e. the ion charge number, is previously specified by the user. It is needless to say that a single value may be specified for the ion charge number, although a range of ion charge numbers may be specified, such as ion charge numbers of 1 to 3 or 1 to 6.

The isotope discriminator 33 evaluates each of the m/z values given by the bin-C data groups extracted from a measured mass spectrum, on the assumption that the m/z value concerned is the m/z value of a potential monoisotopic ion. Specifically, upon receiving an m/z value to be evaluated, the isotope discriminator 33 calculates a predicted value of the signal intensity ratio of each isotope, using the prediction equations based on the information stored in the prediction equation storage section 34, on the assumption that the given m/z value is a monoisotopic ion. Using the predicted values of the plurality of signal intensities, the isotope discriminator 33 creates a theoretically predicted mass spectrum over the charge-number range specified by the user (Step S23). The predicted mass spectrum includes an isotopic peak pattern using the signal intensities calculated based on the prediction equations.

After the predicted mass spectrum has been obtained, the isotope discriminator 33 determines whether or not the predicted mass spectrum matches with the peak pattern formed by the bin-C data groups based on the measured mass spectrum, in terms of both the m/z values and (relative) signal intensities of the peaks which are present within an m/z range higher than a set m/z value (Step S24). For this determination, acceptable limits for the upper and lower allowable values are calculated based on prior information, such as device-specific errors in terms of the mass and isotope signal intensity ratio. For example, if the used device has a mass error with a standard deviation of 1 mDa and a relative-intensity-ratio error with a standard deviation of 5%, a 6-sigma method can be used, in which case the maximum limits for the mass accuracy and isotope intensity ratio will be 6 mDa and 30%, respectively. If it is determined that the predicted mass spectrum matches with the measured spectrum in terms of the isotopic peak pattern, it is concluded that the set m/z value is the monoisotopic ion of the target component, so that the m/z value is retained, while the other m/z values are considered to be the isotopic ions of the same component and are deleted (Step S25). All m/z values given by the bin-C data groups are sequentially checked in a similar manner, for example, in order of increasing m/z from the lowest m/z value to the highest one.

However, as noted earlier, a deviation from the prediction equation needs to be considered if a specific kind of element other than carbon, hydrogen, oxygen and nitrogen is contained in the target component.

For example, sulfur mainly makes a quantitatively significant contribution to the second isotope [A+2]. Therefore, it is preferable that the allowable range of the signal intensity ratio at this isotope be asymmetrically adjusted. Specifically, the upper allowable range of the signal intensity should be increased to allow for a potential contribution from sulfur. The most common number of atoms of the sulfur present in an organic compound which may possibly be observed in normal situations is one or two. Accordingly, in order to allow for the presence of sulfur, the upper limit of the allowable value of the difference in signal intensity ratio at the second isotope [A+2] should preferably be increased to 8%.

If chlorine and bromine are present in the target component, the contribution of those elements to the second isotope [A+2] is quantitatively more significant, so that the resulting isotope cluster may possibly include some additional species different from those included in the isotope cluster determined by the previously described method. Due to such a problem, it is difficult to simply apply the previously described isotope discrimination process in the present case. That is to say, if the previously described isotope discrimination process is applied to the recognition of the isotope cluster of those species, the entire isotope profile will have two or more separate groups including the recognized isotopic species, depending on the total number of chlorine and/or bromine atoms present in the compound molecule. Accordingly, incorrect discrimination occurs at this stage. However, the incorrect discrimination can be recognized in the component identification process (which will be described later), and the separate groups can be eventually reunited and identified as a single component.

By the processing in Steps S24 and S25, at least information concerning the peaks which have been identified as isotopic ions of the target component is removed from the bin-C data groups. However, the remaining data contains not only the information concerning the monoisotopic ion of the target component but also the information concerning undefined ions.

[3-3] Noise Removal Using Characteristics of Chromatogram

Based on the bin-C data groups, the noise remover 35 performs the following processes to create bin-D data groups, bin-E data groups and bin-F data groups, which are all derived from the bin-C data groups (Step S26). Specifically, the noise remover 35 aggregates signal intensity values which fall within a wide allowable m/z width (e.g. 100 mDa) in the bin-C data groups (for example, by adding the values at each point in time) and stores the result as the bin-D data groups. If there are a plurality of bin-C data groups corresponding to an m/z-value range (e.g. with an allowable m/z width of 100 mDa) in each bin-D data group, those bin-C data groups are extracted and stored as the bin-E data group. Furthermore, each bin-E data group is divided into a plurality of subgroups in the temporal direction, and a bin-F data group is created from each subgroup including the signal intensity values belonging to the subgroup.

The bin-D data groups, bin-E data groups and bin-F data groups are conveniently created for use in the background noise removal process which will be described later. The method for creating those groups of data is not essential.

One commonly known approach to the definition of a true chromatogram peak in a quantitative analysis is to calculate the signal-to-noise ratio which is the ratio of the signal intensity based on the identified peak to the signal intensity of the noise determined from a separate area of the chromatogram. This method is particularly useful if there is a continuous noise signal in the chromatogram. In many cases, such a noise signal contains electrical noise originating from the device itself as well as a noise signal due to an ion species originating from a foreign substance that cannot be isolated by the chromatograph.

However, in many commercially available high-resolution mass spectrometers which are used for precision analysis, it is often the case that electronic noise in the form of an intermittent, low-level signal occurs in addition to the previously mentioned types of noise. Furthermore, ions originating from a compound that does not interact with the column in the LC may possibly be present over two or more different periods of elution time, with varying levels of ion intensity. Noise signals due to those ions are mixed in the aforementioned low-level electronic noise signal. In the present embodiment, those types of background noise are removed by the following procedure (Step S27).

The noise removal process has the following two stages:

<First Stage>

In the first stage, a determination for each bin-E data group is carried out. Specifically, the individual bin-C data groups included in each bin-E data group are compared with each other in terms of the maximum peak intensity. This technique is analogous to the commonly known evaluation of the signal-to-noise ratios of the peaks. The maximum signal intensity in each bin-C data group is compared with the maximum signal intensities in the other bin-C data groups located at different points in time to determine how many times the signal intensity concerned is higher than the other. For example, a typical threshold of the signal intensity ratio which is allowable is 5, in which case a signal intensity ratio equal to or higher than 5 is considered to have passed the test.

For example, consider the case of a bin-E data group which includes 100 bin-C data groups. A total of 99 values of the signal intensity ratio are calculated for each of the 100 bin-C data groups. The number of occurrences of the case where the signal intensity ratio exceeds the threshold is counted. Based on the counted result, a value which shows the proportion of the occurrence of the total number of the bin-C data groups in that specific bin-E data group is calculated in percentage value. This percentage value is hereinafter called the "peak score". The allowable level of the peak score for a bin-C data group to be considered as a "true peak" with reference to the "background noise signal" can be set by the user. For example, the allowable level may be set to be equal to or higher than 50%.

<Second Stage>

In the second stage, each bin-C data group is compared with the adjacent bin-C data groups in terms of the maximum peak intensity. A "pre-ratio" and "post-ratio" are calculated for each bin-C data group. The pre-ratio is the peak intensity ratio of the bin-C data group in question to the temporally preceding bin-C data group. The post-ratio is the peak intensity ratio of the bin-C data group in question to the temporally following bin-C data group. The bin-C data group in question is identified as a "true peak" if both the pre-ratio and post-ratio calculated for that bin-C data group exceed a preset threshold (e.g. 5).

In some cases, the process result of the second stage invalidates the assignment (identification) in the first stage. That is to say, if a peak has been incorrectly identified as a "true peak" in the processing of the first stage, this error can be corrected in the second stage, and it can be concluded that the peak is not a "true peak".

By the processing of Steps S20 through S27, the monoisotopic ion peak corresponding to the target component can be determined, and the m/z value and retention time of that peak can be obtained (Step S28). The information concerning the monoisotopic ion peaks of the components identified based on the three-dimensional data is aggregated to create a list.

[3-4] Validation of Component Identification Result

Figure 4:
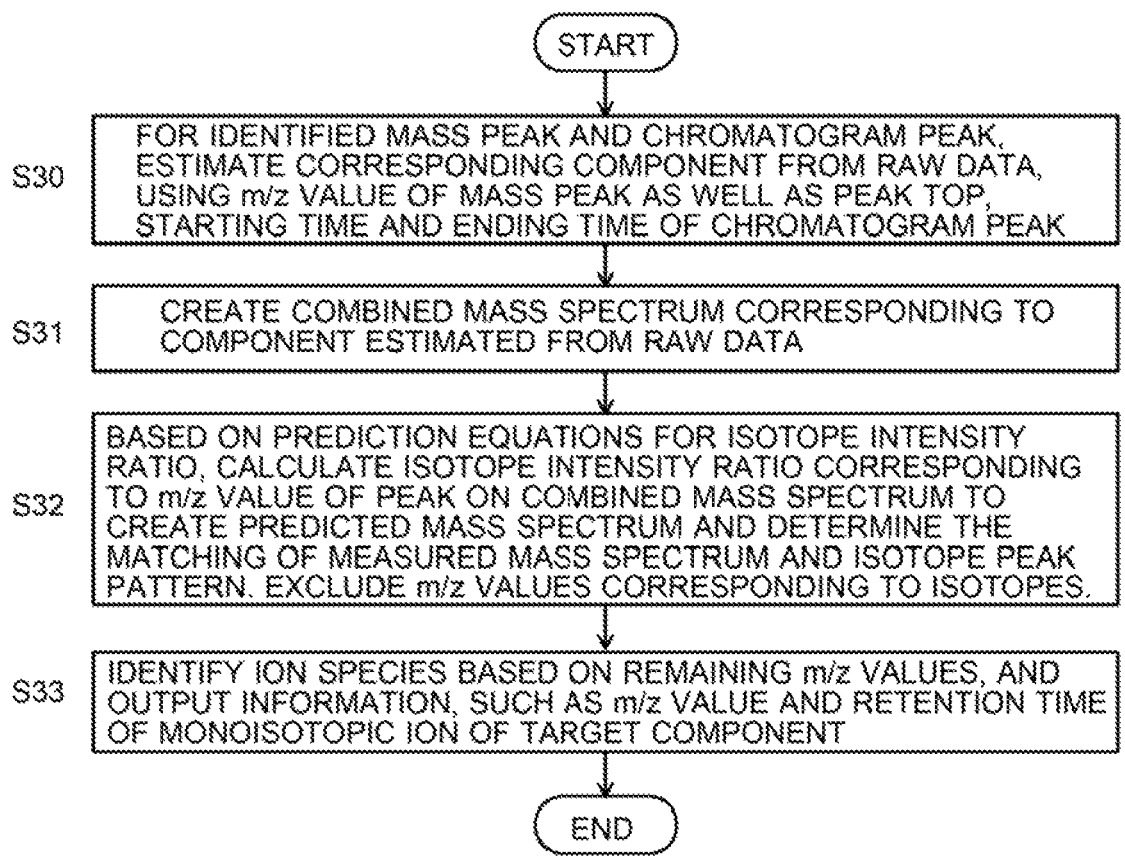
FIG. 4 is a flowchart of a validation process in the LC-MS according to the present embodiment.

Next, by the procedure described in the flowchart shown in FIG. 4, the identification result validator 36 determines whether or not the true peaks identified in the previously determined manner are appropriate peaks, using the raw data.

Using the m/z value of each identified mass peak in the list as well as the peak top, start time and end time (rough values) of the chromatogram peak corresponding to that mass peak, the identification result validator 36 estimates a component which is likely to correspond to the mass peak and the chromatogram peak from the raw data (Step S30). Then, the identification result validator 36 creates a combined mass spectrum for the estimated component by averaging a plurality of mass spectra included in the time range from the starting point to the ending point of the chromatogram peak (Step S31).

In place of the time range from the beginning point to the ending point of the chromatogram peak, a narrower time range may be set, such as a predetermined time range centered on the peak top. However, it should be noted that the accuracy of the combined mass spectrum decreases if a mass spectrum whose signal intensity exceeds the saturation level is mixed in the mass spectra used as the basis for calculating the combined mass spectrum. Therefore, the mixture of a mass spectrum whose signal intensity exceeds the saturation level should preferably be avoided. To this end, it is preferable to exclude mass spectra acquired in the vicinity of the peak top of the chromatogram peak.

After the combined mass spectrum has been created in Step S31, the previously described technique of Steps S23 and S24 is applied to exclude the m/z values corresponding to the isotopes from the peaks observed on the combined mass spectrum (Step S32). The data aggregation process corresponding to Steps S20 through S22 (i.e. the process of rounding the data) is not performed in the present step; the combined mass spectrum calculated from the raw data is directly used. Therefore, a more accurate isotope distribution is obtained, so that the isotopic ions originating from the target component can be more correctly discriminated from the other ions. For example, a peak which has been incorrectly identified as a true peak can be excluded in the second stage.

After the exact m/z values have been determined for all identified mass peaks in the list by the validation process according to Steps S30 through S33, the identification result validator 36 eventually identifies a specific ion species based on the m/z value of each mass peak, such as the adduct ion, neutral loss or multimer. For monoisotopic ions resulting from the protonation or deprotonation, their exact m/z values are calculated and compiled into a list (Step S33). Exact retention times, which can be determined from the chromatogram peaks concerned, can also be included in the list. Then, the list is displayed as the component identification result on the display unit 5, and the entire processing is completed.

As described to this point, the LC-MS according to the present embodiment has a particularly improved level of discrimination accuracy for a peak corresponding to an isotopic ion which has conventionally been easily overlooked or incorrectly discriminated. Therefore, the isotopic ion peaks originating from one component can be removed to more correctly identify the component.

[4] Experimental Example

<Actual Example of Isotope Cluster Prediction>

An experimental example of the isotope discrimination method using the previously described equations for predicting the isotope signal intensity ratio is hereinafter described. The following three compounds are taken as examples.

Example 1: chemical formula, $C_{24}H_{27}N_3O_4$; charge state, 1

Example 2: chemical formula, $C_{41}H_{65}NO_{10}$; charge state, 1

Example 3: chemical formula, $C_{129}H_{198}N_{36}O_{36}$; charge state, 6

For each of these examples, a theoretical isotope model was created using a commercially available software package ("Mass Calculator" function of Shimadzu LabSolutions Insight v3.4) to acquire a reference mass spectrum to be compared with an output obtained by carrying out the previously described method for each of those examples.

Example 1: Chemical Formula, $C_{24}H_{27}N_3O_4$

A reference mass spectrum based on a theoretical isotope model created by the commercially available software package is shown in FIG. 12B. A mass spectrum estimated from the prediction equations by the previously described method is shown in FIG. 12A.

Example 2: Chemical Formula, $C_{41}H_{65}NO_{10}$

A reference mass spectrum based on a theoretical isotope model created by the commercially available software package is shown in FIG. 13B. A mass spectrum estimated from the prediction equations by the previously described method is shown in FIG. 13A.

Example 3: Chemical Formula, $C_{129}H_{198}N_{36}O_{36}$

A reference mass spectrum based on a theoretical isotope model created by the commercially available software package is shown in FIG. 14B. A mass spectrum estimated from the prediction equations by the previously described method is shown in FIG. 14A.

The experimental results demonstrate that the estimated spectrum based on the prediction equations matches with the reference mass spectrum to a considerable degree of accuracy in any of the Examples 1-3. Therefore, it is possible to conclude that the reliability of the accuracy of the estimation of the isotope cluster based on the previously described prediction equations is sufficiently high.

<Actual Example of Background Noise Removal Process>

Actual Example of First Stage:

The allowable level of the peak score in the present example was set at 35%. An extracted ion chromatogram at m/z 165.1 created from bin-A data groups is shown in FIG. 15A. The bin-C data groups created from the bin-A data groups are shown in FIG. 15B. FIG. 16 shows the peak scores calculated for this component of m/z 165.1 for all bin-C data groups included in the bin-E data groups.

In the present example, each bin-C data group showing a peak score equal to or higher than 35% is considered to have passed the test. Accordingly, only the bin-C data group with a retention time of 4.25 minutes is extracted as the "true peak". As is evident from FIG. 15A, this bin-C data group is sufficiently separated from the other components by the LC. There is no temporally adjacent bin-C data group. Therefore, this single bin-C data group with the retention time of 4.25 minutes is selected as a data group corresponding to the true peak, whereas the other bin-C data groups are entirely excluded. In this example, the processing of the second stage is unnecessary since the selected bin-C data group has no temporally adjacent bin-C data group.

Actual Example of Second Stage:

An extracted ion chromatogram at m/z 618.2 created from bin-A data groups is shown in FIG. 17A. The bin-C data groups created from the bin-A data groups is shown in FIG. 17B. FIG. 18 shows the data of an unprocessed component, the calculated peak score as well as the pre-intensity ratio and the post-intensity ratio for each component.

Once again, in the processing of the first stage, each bin-C data group showing a peak score equal to or higher than 35% is considered to have passed the test. Accordingly, only one bin-C data group (Component #=18; retention time, 8 minutes) satisfies the criterion and recognized as a "true peak". Since this selected bin-C data group is adjacent to other bin-C data groups, the processing of the second stage should be applied to it. The bin-C data group of Component #=18 has a pre-intensity ratio of 1.0 and a post-intensity ratio of 2.09. These values do not exceed the threshold of the intensity ratio, i.e. 5. Therefore, the bin-C data group selected in the first stage is not recognized as a true peak and will be excluded.

Thus, in the background noise removal process using the characteristics of the chromatogram, a peak which has been sufficiently isolated by the LC is selected as a true peak by the two-stage processing of the first and second stages, whereas a waveform which cannot be considered to be a single-component peak is not selected as a true peak. Therefore, a chromatogram peak sufficiently isolated by the LC can be selected.

It is evident that the previously described embodiment is one example of the present invention, and any modification, change or addition appropriately made within the spirit of the present invention will also fall within the scope of claims of the present application.

For example, although the previous embodiment is an LC-MS, it is evident that the present invention can also be applied in a GC-MS.

[Various Modes]

It is evident for a person skilled in the art that the previously described illustrative embodiment is a specific example of the following modes of the present invention.

(Clause 1) One mode of the data processing method for chromatograph mass spectrometry according to the present invention is a data processing method for chromatograph mass spectrometry configured to process three-dimensional data having the three dimensions of time, mass-to-charge ratio and signal intensity collected by chromatograph mass spectrometry, the method including:

a prediction equation creation step configured to create and store a prediction equation for each of different kinds of isotopic ions originating from a compound, the prediction equation including the charge state of an ion as a parameter and expressing a relationship between the mass-to-charge ratio of a monoisotopic ion of the compound and an intensity ratio between the signal intensity at the monoisotopic ion of the compound and the signal intensity of an isotopic ion in a mass spectrum;

a predicted mass spectrum creation step configured to calculate a predicted value of the signal intensity ratio related to each isotopic ion, by applying information of the mass-to-charge ratio corresponding to a peak observed on a measured mass spectrum acquired based on the three-dimensional data for a target sample, and information of a given charge state of the ion, in the prediction equations respectively created for the different isotopic ions in the prediction equation step, and to create, based on the predicted values, a predicted mass spectrum for a situation in which a monoisotopic ion and one or more isotopic ions originating from one compound are present; and a mass spectrum evaluation step configured to evaluate the possibility that a plurality of peaks in the measured mass spectrum are peaks corresponding to a monoisotopic ion and one or more isotopic ions originating from one compound, by comparing the predicted mass spectrum and the measured mass spectrum.

(Clause 5) One mode of the chromatograph mass spectrometer according to the present invention includes:

a prediction equation storage section configured to store a plurality of prediction equations which respectively correspond to different kinds of isotopic ions originating from a compound, where each of the prediction equations includes the charge state of an ion as a parameter and expresses a relationship between the mass-to-charge ratio of a monoisotopic ion of the compound and an intensity ratio between the signal intensity at the monoisotopic ion of the compound and the signal intensity of an isotopic ion in a mass spectrum;

a measurement section configured to perform chromatograph mass spectrometry on a sample to collect three-dimensional data having the three dimensions of time, mass-to-charge ratio and signal intensity;

a predicted mass spectrum creation section configured to calculate a predicted value of the signal intensity ratio related to each isotopic ion, by applying information of the mass-to-charge ratio corresponding to a peak observed on a measured mass spectrum acquired based on the three-dimensional data, and information of a given charge state of the ion, in the plurality of prediction equations stored in the prediction equation storage section, and to create, based on the predicted values, a predicted mass spectrum for a situation in which a monoisotopic ion and one or more isotopic ions originating from one compound are present; and a mass spectrum evaluation section configured to evaluate the possibility that a plurality of peaks in the measured mass spectrum are peaks corresponding to a monoisotopic ion and one or more isotopic ions originating from one compound, by comparing the predicted mass spectrum and the measured mass spectrum.

(Clause 9) One mode of a non-transitory storage medium storing a program for processing chromatograph mass spectrometry data according to the present invention is a non-transitory storage medium storing a program for processing chromatograph mass spectrometry data configured to operate a computer in order to process three-dimensional data having the three dimensions of time, mass-to-charge ratio and signal intensity collected by chromatograph mass spectrometry, where the program makes the computer function as:

a prediction equation storage functional section configured to store a plurality of prediction equations which respectively correspond to different kinds of isotopic ions originating from a compound, where each of the prediction equations includes the charge state of an ion as a parameter and expresses a relationship between the mass-to-charge ratio of a monoisotopic ion of the compound and an intensity ratio between the signal intensity at the monoisotopic ion of the compound and the signal intensity of an isotopic ion in a mass spectrum;

a predicted mass spectrum creation functional section configured to calculate a predicted value of the signal intensity ratio related to each isotopic ion, by applying information of the mass-to-charge ratio of a peak observed on a measured mass spectrum acquired based on the three-dimensional data for a target sample, and information of a given charge state of the ion, in the plurality of prediction equations corresponding to the different isotopic ions stored in the prediction equation storage functional section, and to create, based on the predicted values, a predicted mass spectrum for a situation in which a monoisotopic ion and one or more isotopic ions originating from one compound are present; and a mass spectrum evaluation functional section configured to evaluate the possibility that a plurality of peaks in the measured mass spectrum are peaks corresponding to a monoisotopic ion and one or more isotopic ions originating from one compound, by comparing the predicted mass spectrum and the measured mass spectrum.

By the data processing method for chromatograph mass spectrometry described in Clause 1, the chromatograph mass spectrometer described in Clause 5, or the non-transitory storage medium storing a program for processing chromatograph mass spectrometry data described in Clause 9, it is possible to correctly determine that a monoisotopic ion peak originating from one compound and one or more isotopic ion peaks observed on a mass spectrum have originated from the same compound. Therefore, the situation in which such isotopic ion peaks are detected as false-positive peaks can be avoided. As a result, the peaks corresponding to the ions originating from the compound of interest can be correctly identified. There is only a small number of kinds of parameters to be set by a user for such a correct peak detection or other related tasks. This reduces the burden on the user as well as shortens the period of time required for the data-processing task.

(Clause 2) The data processing method for chromatograph mass spectrometry described in Clause 1 may further include a candidate mass-to-charge-ratio extraction step configured to extract, for a set of three-dimensional data on a target sample, a plurality of mass-to-charge ratios at which a change in signal intensity in the temporal direction shows a shape that can be considered as a peak within the same time segment, and the predicted mass spectrum creation step may be configured to determine a predicted value of the signal intensity ratio related to each isotope ion using the prediction equations for the peaks at the mass-to-charge ratios extracted in the candidate mass-to-charge-ratio extraction step.

(Clause 6) The chromatograph mass spectrometer described in Clause 5 may further include a candidate mass-to-charge-ratio extraction section configured to extract, for a set of three-dimensional data on a target sample, a plurality of mass-to-charge ratios at which a change in signal intensity in the temporal direction shows a shape that can be considered as a peak within the same time segment, and the predicted mass spectrum creation section may be configured to determine a predicted value of the signal intensity ratio related to each isotope ion using the prediction equations for the peaks at the mass-to-charge ratios extracted by the candidate mass-to-charge-ratio extraction section.

By the data processing method for chromatograph mass spectrometry described in Clause 2 or the chromatograph mass spectrometer described in Clause 6, various noise factors can be removed, and the influence of a mass error in the device can be removed, so that it is possible to correctly determine whether or not a group of peaks observed on a measured mass spectrum are isotopic ion peaks of one compound.

(Clause 3) The data processing method for chromatograph mass spectrometry described in Clause 1 may further include a noise removal step configured to discriminate a peak corresponding to a significant component from noise based on a temporal change in signal intensity at a mass-to-charge ratio of a peak whose origin is likely to be a monoisotopic ion originating from one compound in the mass spectrum evaluation step.

(Clause 7) The chromatograph mass spectrometer described in Clause 5 may further include a noise removal section configured to discriminate a peak corresponding to a significant component from noise based on a temporal change in signal intensity at a mass-to-charge ratio of a peak whose origin is likely to be a monoisotopic ion originating from one compound in the mass spectrum evaluation section.

By the data processing method for chromatograph mass spectrometry described in Clause 3 or the chromatograph mass spectrometer described in Clause 7, the influence of the noise due to various factors can be removed, and an exact component identification can be achieved.

(Clause 4) In the data processing method for chromatograph mass spectrometry described in Clause 1, the prediction equation may be an equation created based on a theoretical isotope model of a compound having a repetitive structure in which the unit of repetition is a partial structure containing two or more elements selected from carbon, hydrogen oxygen and nitrogen at a predetermined composition ratio.

(Clause 8) In the chromatograph mass spectrometer described in Clause 5, the prediction equation may be an equation created based on a theoretical isotope model of a compound having a repetitive structure in which a partial structure containing two or more elements selected from carbon, hydrogen oxygen and nitrogen at a predetermined composition ratio is the unit of repetition.

By the data processing method for chromatograph mass spectrometry described in Clause 4 or the chromatograph mass spectrometer described in Clause 8, a prediction equation can be obtained by which an isotope signal intensity ratio for various organic compounds which are main analysis targets can be predicted with a high level of certainty.

REFERENCE SIGNS LIST

1 . . . Measurement Unit
10 . . . Liquid Chromatograph Section
11 . . . Mobile Phase Container
12 . . . Liquid-Supply Pump
13 . . . Injector
14 . . . Column
20 . . . Mass Spectrometer Section
21 . . . Ionization Probe
22 . . . Desolvation Tube
23, 24 . . . Ion Guide
25 . . . Quadrupole Mass Filter
26 . . . Ion Detector
27 . . . Analogue-to-Digital Converter
3 . . . Data Processing Unit
30 . . . Data Storage Section
31 . . . Component Identification Processor
32 . . . Data Preprocessor
33 . . . Isotope Discriminator
34 . . . Prediction Equation Storage Section
35 . . . Noise Remover
36 . . . Identification Result Validator
37 . . . Display Processor
4 . . . Input Unit
5 . . . Display Unit

The invention claimed is:

1. A data processing method for chromatograph mass spectrometry configured to process three-dimensional data having three dimensions of time, mass-to-charge ratio and signal intensity collected by chromatograph mass spectrometry, the method comprising:

a prediction equation creation step configured to create and store a prediction equation for each of different kinds of isotopic ions originating from a compound, the prediction equation including a charge state of an ion as a parameter and expressing a relationship between the mass-to-charge ratio of a monoisotopic ion of the compound and an intensity ratio between the signal intensity at the monoisotopic ion of the compound and the signal intensity of an isotopic ion in a mass spectrum;

a predicted mass spectrum creation step configured to calculate a predicted value of the signal intensity ratio related to each isotopic ion, by applying information of the mass-to-charge ratio corresponding to a peak observed on a measured mass spectrum acquired based on the three-dimensional data for a target sample, and information of a given charge state of the ion, in the prediction equations respectively created for the different isotopic ions in the prediction equation step, and to create, based on the predicted values, a predicted mass spectrum for a situation in which a monoisotopic ion and one or more isotopic ions originating from one compound are present; and a mass spectrum evaluation step configured to evaluate a possibility that a plurality of peaks in the measured mass spectrum are peaks corresponding to a monoisotopic ion and one or more isotopic ions originating from one compound, by comparing the predicted mass spectrum and the measured mass spectrum.

2. The data processing method for chromatograph mass spectrometry according to claim 1, further comprising a candidate mass-to-charge-ratio extraction step configured to extract, for a set of three-dimensional data on a target sample, a plurality of mass-to-charge ratios at which a change in signal intensity in the temporal direction shows a shape that can be considered as a peak within the same time segment, wherein the predicted mass spectrum creation step is configured to determine a predicted value of the signal intensity ratio related to each isotope ion using the prediction equations for the peaks at the mass-to-charge ratios extracted in the candidate mass-to-charge-ratio extraction step.

3. The data processing method for chromatograph mass spectrometry according to claim 1, further comprising a noise removal step configured to discriminate a peak corresponding to a significant component from noise based on a temporal change in signal intensity at a mass-to-charge ratio of a peak whose origin is likely to be a monoisotopic ion originating from one compound in the mass spectrum evaluation step.

4. The data processing method for chromatograph mass spectrometry according to claim 1, wherein the prediction equation is an equation created based on a theoretical isotope model of a compound having a repetitive structure in which a unit of repetition is a partial structure containing two or more elements selected from carbon, hydrogen oxygen and nitrogen at a predetermined composition ratio.

5. A chromatograph mass spectrometer, comprising:
a prediction equation storage section configured to store a plurality of prediction equations which respectively correspond to different kinds of isotopic ions originating from a compound, where each of the prediction equations includes a charge state of an ion as a parameter and expresses a relationship between a mass-to-charge ratio of a monoisotopic ion of the compound and an intensity ratio between a signal intensity at the monoisotopic ion of the compound and a signal intensity of an isotopic ion in a mass spectrum;
a measurement section configured to perform chromatograph mass spectrometry on a sample to collect three-dimensional data having three dimensions of time, mass-to-charge ratio and signal intensity;
a predicted mass spectrum creation section configured to calculate a predicted value of the signal intensity ratio related to each isotopic ion, by applying information of the mass-to-charge ratio corresponding to a peak observed on a measured mass spectrum acquired based on the three-dimensional data, and information of a given charge state of the ion, in the plurality of prediction equations stored in the prediction equation storage section, and to create, based on the predicted values, a predicted mass spectrum for a situation in which a monoisotopic ion and one or more isotopic ions originating from one compound are present; and
a mass spectrum evaluation section configured to evaluate a possibility that a plurality of peaks in the measured mass spectrum are peaks corresponding to a monoisotopic ion and one or more isotopic ions originating from one compound, by comparing the predicted mass spectrum and the measured mass spectrum.

6. The mass spectrometer according to claim 5, further comprising a candidate mass-to-charge-ratio extraction section configured to extract, for a set of three-dimensional data on a target sample, a plurality of mass-to-charge ratios at which a change in signal intensity in the temporal direction shows a shape that can be considered as a peak within the same time segment,
wherein the predicted mass spectrum creation section may be configured to determine a predicted value of the signal intensity ratio related to each isotope ion using the prediction equations for the peaks at the mass-to-charge ratios extracted by the candidate mass-to-charge-ratio extraction section.

7. The mass spectrometer according to claim 5, further comprising a noise removal section configured to discriminate a peak corresponding to a significant component from noise based on a temporal change in signal intensity at a mass-to-charge ratio of a peak whose origin is likely to be a monoisotopic ion originating from one compound in the mass spectrum evaluation section.

8. The mass spectrometer according to claim 5, wherein the prediction equation is an equation created based on a theoretical isotope model of a compound having a repetitive structure in which a partial structure containing two or more elements selected from carbon, hydrogen oxygen and nitrogen at a predetermined composition ratio is the unit of repetition.

9. A non-transitory storage medium storing a program for processing chromatograph mass spectrometry data configured to operate a computer in order to process three-dimensional data having three dimensions of time, mass-to-charge ratio and signal intensity collected by chromatograph mass spectrometry, wherein the program makes the computer function as:
a prediction equation storage functional section configured to store a plurality of prediction equations which respectively correspond to different kinds of isotopic ions originating from a compound, where each of the prediction equations includes a charge state of an ion as a parameter and expresses a relationship between the mass-to-charge ratio of a monoisotopic ion of the compound and an intensity ratio between the signal intensity at the monoisotopic ion of the compound and the signal intensity of an isotopic ion in a mass spectrum;
a predicted mass spectrum creation functional section configured to calculate a predicted value of the signal intensity ratio related to each isotopic ion, by applying information of the mass-to-charge ratio of a peak observed on a measured mass spectrum acquired based on the three-dimensional data for a target sample, and information of a given charge state of the ion, in the plurality of prediction equations corresponding to the different isotopic ions stored in the prediction equation storage functional section, and to create, based on the predicted values, a predicted mass spectrum for a situation in which a monoisotopic ion and one or more isotopic ions originating from one compound are present; and
a mass spectrum evaluation functional section configured to evaluate a possibility that a plurality of peaks in the measured mass spectrum are peaks corresponding to a monoisotopic ion and one or more isotopic ions originating from one compound, by comparing the predicted mass spectrum and the measured mass spectrum.

* * * * *